(12) United States Patent
Spitaels et al.

(10) Patent No.: US 8,610,316 B2
(45) Date of Patent: *Dec. 17, 2013

(54) APPARATUS AND METHOD FOR SCALABLE POWER DISTRIBUTION

(75) Inventors: James S. Spitaels, Shrewsbury, MA (US); Michael Jansma, Eureka, MO (US); Patrick Riley Johnson, Chesterfield, MO (US); William Ziegler, Reading, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,006

(22) Filed: Jul. 2, 2012

(65) Prior Publication Data
US 2013/0140915 A1   Jun. 6, 2013

Related U.S. Application Data

(63) Continuation of application No. 12/630,503, filed on Dec. 3, 2009, now Pat. No. 8,212,427.

(51) Int. Cl.
*H01B 7/30* (2006.01)

(52) U.S. Cl.
USPC .......................................................... 307/147

(58) Field of Classification Search
USPC .......................................................... 307/147
See application file for complete search history.

(56) References Cited

U.S. PATENT DOCUMENTS

| | | | |
|---|---|---|---|
| 2,860,742 A | 11/1958 | Waters, Sr. et al. | |
| 3,968,322 A | 7/1976 | Taylor | |
| 4,139,252 A | 2/1979 | Gorny | |
| 4,158,754 A | 6/1979 | Yonezaki et al. | |
| 4,218,108 A | 8/1980 | El Mouchi | |
| 4,320,261 A | 3/1982 | Scerbo et al. | |
| 4,366,390 A | 12/1982 | Rathmann | |
| 4,497,411 A | 2/1985 | DeBortoli | |
| 4,608,499 A | 8/1986 | Rathmann | |
| 4,611,289 A | 9/1986 | Coppola | |
| 4,641,225 A | 2/1987 | Reichle | |
| 4,656,767 A | 4/1987 | Tarrant | |

(Continued)

FOREIGN PATENT DOCUMENTS

| | | |
|---|---|---|
| DE | 103 07 353 A1 | 11/2003 |
| DE | 20 2006 015827 U1 | 12/2006 |
| FR | 2 423 898 A1 | 11/1979 |

OTHER PUBLICATIONS

International Search Report for PCT/US2010/058658 mailed Apr. 5, 2011.

*Primary Examiner* — Robert L. Deberadinis
(74) *Attorney, Agent, or Firm* — Lando & Anastasi, LLP

(57) ABSTRACT

In one aspect, the invention provides a system for power distribution. According to some embodiments, the system includes a rack mountable power distribution unit including a housing having a first end and a second end, the housing also including an outer wall defining a cavity within the housing, and fastening elements configured to allow the housing to be mounted within an electrical equipment rack. In accordance with these embodiments, the outer wall of the housing includes an opening extending linearly between the first end and the second end of the housing and a plurality of electrical conductors located within the cavity and oriented linearly between the first end and the second end. In accordance with further embodiments, the system includes a tap module.

20 Claims, 15 Drawing Sheets

(56) References Cited

U.S. PATENT DOCUMENTS

| | | |
|---|---|---|
| 4,674,031 A | 6/1987 | Siska, Jr. |
| 4,769,555 A | 9/1988 | Pequet et al. |
| 4,860,168 A | 8/1989 | Wiljanen et al. |
| 4,919,625 A | 4/1990 | Coutre |
| 4,970,623 A | 11/1990 | Pintar |
| 5,071,367 A | 12/1991 | Luu |
| 5,094,626 A | 3/1992 | Fabrizi et al. |
| 5,184,025 A | 2/1993 | McCurry et al. |
| 5,260,864 A | 11/1993 | Simonelli et al. |
| 5,274,808 A | 12/1993 | Miyao et al. |
| 5,291,383 A | 3/1994 | Oughton |
| 5,384,792 A | 1/1995 | Hirachi |
| 5,424,903 A | 6/1995 | Schreiber |
| 5,450,272 A | 9/1995 | Van Gaal et al. |
| 5,457,600 A | 10/1995 | Campbell et al. |
| 5,534,734 A | 7/1996 | Pugh et al. |
| 5,596,479 A | 1/1997 | Campbell et al. |
| 5,639,048 A | 6/1997 | Bartholomew et al. |
| 5,675,194 A | 10/1997 | Domigan |
| 5,677,831 A | 10/1997 | Lin |
| 5,686,768 A | 11/1997 | Thomsen et al. |
| 5,694,312 A | 12/1997 | Brand et al. |
| 5,721,934 A | 2/1998 | Scheurich |
| 5,764,503 A | 6/1998 | Brand et al. |
| 5,784,628 A | 7/1998 | Reneris |
| 5,901,067 A | 5/1999 | Kao et al. |
| 5,923,103 A | 7/1999 | Pulizzi et al. |
| 5,949,974 A | 9/1999 | Ewing et al. |
| 5,969,292 A | 10/1999 | Snider, Jr. et al. |
| 5,982,652 A | 11/1999 | Simonelli et al. |
| 5,998,732 A | 12/1999 | Caveney et al. |
| 6,002,563 A | 12/1999 | Esakoff et al. |
| 6,039,584 A | 3/2000 | Ross |
| 6,049,143 A | 4/2000 | Simpson et al. |
| 6,122,155 A | 9/2000 | Aromin et al. |
| 6,129,316 A | 10/2000 | Bauer |
| 6,201,319 B1 | 3/2001 | Simonelli et al. |
| 6,215,064 B1 | 4/2001 | Noble et al. |
| 6,219,795 B1 | 4/2001 | Klein |
| 6,301,095 B1 | 10/2001 | Laughlin et al. |
| 6,310,783 B1 | 10/2001 | Winch et al. |
| 6,329,616 B1 | 12/2001 | Lee |
| 6,365,830 B1 | 4/2002 | Snider, Jr. et al. |
| 6,373,721 B2 | 4/2002 | Lecinski et al. |
| 6,411,506 B1 | 6/2002 | Hipp et al. |
| 6,431,501 B1 | 8/2002 | Molek |
| 6,437,243 B1 | 8/2002 | VanderVelde et al. |
| 6,445,088 B1 | 9/2002 | Spitaels et al. |
| 6,486,407 B1 | 11/2002 | Hawker et al. |
| 6,541,704 B1 | 4/2003 | Levenson et al. |
| 6,541,705 B1 | 4/2003 | McGrath |
| 6,560,084 B1 | 5/2003 | Bilac et al. |
| 6,586,673 B1 | 7/2003 | Socarras |
| 6,603,073 B2 | 8/2003 | Ferris |
| 6,651,362 B2 | 11/2003 | Caveney |
| 6,721,672 B2 | 4/2004 | Spitaels et al. |
| 6,741,442 B1 | 5/2004 | McNally et al. |
| 6,834,765 B1 | 12/2004 | Leitl |
| 6,897,747 B2 | 5/2005 | Brandon et al. |
| 6,967,283 B2 | 11/2005 | Rasmussen et al. |
| 6,992,247 B2 | 1/2006 | Rasmussen et al. |
| 7,196,885 B2 | 3/2007 | Pierce et al. |
| 7,312,980 B2 | 12/2007 | Ewing et al. |
| 7,358,439 B2 | 4/2008 | Rasmussen et al. |
| 7,425,682 B2 | 9/2008 | Rasmussen et al. |
| 7,606,014 B2 | 10/2009 | Ziegler et al. |
| 7,619,868 B2 | 11/2009 | Spitaels et al. |
| 7,982,335 B2 | 7/2011 | Aldag et al. |
| 8,212,427 B2 * | 7/2012 | Spitaels et al. ............... 307/147 |
| 2001/0003206 A1 | 6/2001 | Pole et al. |
| 2002/0007464 A1 | 1/2002 | Fung |
| 2002/0024332 A1 | 2/2002 | Gardner |
| 2002/0116139 A1 | 8/2002 | Przydatek et al. |
| 2002/0133728 A1 | 9/2002 | Agarwal |
| 2002/0134567 A1 | 9/2002 | Rasmussen et al. |
| 2002/0178387 A1 | 11/2002 | Theron |
| 2002/0189848 A1 | 12/2002 | Hawker et al. |
| 2002/0194517 A1 | 12/2002 | Cohen et al. |
| 2003/0005339 A1 | 1/2003 | Cohen et al. |
| 2003/0009705 A1 | 1/2003 | Thelander et al. |
| 2003/0223234 A1 | 12/2003 | Tang |
| 2004/0231875 A1 | 11/2004 | Rasmussen et al. |
| 2005/0243485 A1 | 11/2005 | Gershen et al. |
| 2007/0291433 A1 | 12/2007 | Ziegler et al. |
| 2010/0041277 A1 | 2/2010 | Huber et al. |

* cited by examiner

ID="1"/>
APPARATUS AND METHOD FOR SCALABLE POWER DISTRIBUTION

RELATED APPLICATIONS

This application is a Continuation of U.S. patent application Ser. No. 12/630,503, filed Dec. 3, 2009, now U.S. Pat. No. 8,212,427, which is hereby incorporated herein by reference in its entirety.

BACKGROUND OF INVENTION

1. Field of Invention

Embodiments of the invention relate generally to electrical power distribution equipment. More specifically, at least one embodiment relates to an apparatus and a method for scalable power distribution.

2. Discussion of Related Art

Centralized data centers for computer, communications and other electronic equipment have been in use for a number of years. More recently, with the increasing use of the Internet, large scale data centers that provide hosting services for Internet service providers ("ISPs"), application service providers ("ASPs") and Internet content providers are becoming increasingly popular. Typical centralized data centers contain numerous racks of equipment that require power, cooling and connections to communication facilities.

In general, centralized data centers have a power distribution system configured to avoid power outages because the data centers include a high percentage of critical loads without which an enterprise may be unable to operate. Often, an uninterruptible power supply ("UPS") is employed in the power distribution system to ensure that equipment receives continuous power and avoids any power outages. Typical power distribution systems include racks of equipment, for example, servers and the like that are located in the data center. Generally, a plurality of power distribution circuits are provided where each circuit supplies power to one or more electrical loads (e.g., servers, cooling systems, lighting circuits, etc.) via a circuit breaker. These systems generally include racks in which the circuit breakers are installed (i.e., power distribution units) or alternatively racks that include an electrical panel board which is in general similar in design to the panel boards that are found in ordinary commercial facilities.

Problems with these approaches include the fact that the installation or removal of a circuit breaker from the panel board or power distribution unit requires that a skilled individual (i.e., an electrician) perform the installation or removal in close proximity to energized electrical circuits which may include exposed electrical connections and/or conductors. Alternatively, the power distribution equipment can be de-energized to facilitate the installation or removal of one or more circuit breakers. Of course, given the critical nature of the electrical load in the data centers, even these scheduled outages are undesirable.

Some existing approaches attempt to minimize power interruptions resulting from the connection of new power distribution circuits by providing pre-fabricated plug-in power cables whereby a first end of the cable includes a connector that can be plugged into an output of a circuit breaker at the power distribution unit and a second end that can be connected to an electrical load. Although this approach may allow an electrical load to be safely connected to the circuit breaker without de-energizing the entire power distribution unit (e.g., connected with the panel board energized but without requiring any "hot work"), it requires that the cable lengths be pre-determined. In addition, such systems may not be scalable, that is, each panel board or other power distribution unit may not be configured for the correct size or quantity of circuits and corresponding circuit breakers.

SUMMARY OF INVENTION

In one or more embodiments, the invention provides a modular, scalable power distribution system that provides tap modules that may be safely installed and removed without disrupting other electrical circuits connected to the power distribution unit. As a result, in some embodiments, the invention provides for a scalable power distribution apparatus that provides flexibility to meet the changing electrical needs of a facility such as a data center. For example, in some embodiments, a user can employ a rack mounted power distribution unit to customize the location of the connection for newly added load after the initial installation and without disrupting the power supplied to any previously connected loads. In addition, the user can selectively connect single-phase or three-phase loads to achieve a balanced current draw from a multi-phase source of electrical power. Further, in some embodiments, the preceding can be accomplished by user-selectable connection of individual receptacle outlets to the power distribution system. In still another embodiment, the user-selectable connection is accomplished without de-energizing any portion of the power system that the individual receptacle outlet is connected to.

In one aspect, the invention provides a system for power distribution. According to some embodiments, the system includes a rack mountable power distribution unit including a housing having a first end and a second end, the housing also including an outer wall defining a cavity within the housing, and fastening elements configured to allow the housing to be mounted within an electrical equipment rack. In accordance with these embodiments, the outer wall of the housing includes an opening extending linearly between the first end and the second end of the housing and a plurality of electrical conductors located within the cavity and oriented linearly between the first end and the second end. In accordance with further embodiments, the system includes a tap module including a plurality of contacts extending therefrom wherein each of the plurality of contacts is configured to be inserted into the opening before engaging one of the plurality of electrical conductors within the cavity, respectively.

In accordance with another aspect, the invention provides a tap module including a body; a shaft coupled to the body, the shaft including at least a first region having a first diameter and a second region having a second diameter which is different than the first diameter; and a plurality of contacts included in the shaft and extending therefrom, the contacts including a phase-conductor contact, a neutral-conductor contact and a ground-conductor contact. According to some embodiments, the phase-conductor contact is located in the first region, and one of the neutral-conductor contact and the ground-conductor contact is located in the second region.

In accordance with yet another aspect, the invention provides a method of providing power to a server, the method including acts of: mounting a rack mounted power distribution unit in an electrical equipment enclosure, the rack mounted power distribution unit configured to receive a plurality of electrical modules at plurality of non-fixed locations, respectively, along a length of the rack mounted power distribution unit; coupling an electrical module including an electrical cord at a location selected by a user from among the plurality of non-fixed locations; and connecting the electrical cord to the server.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
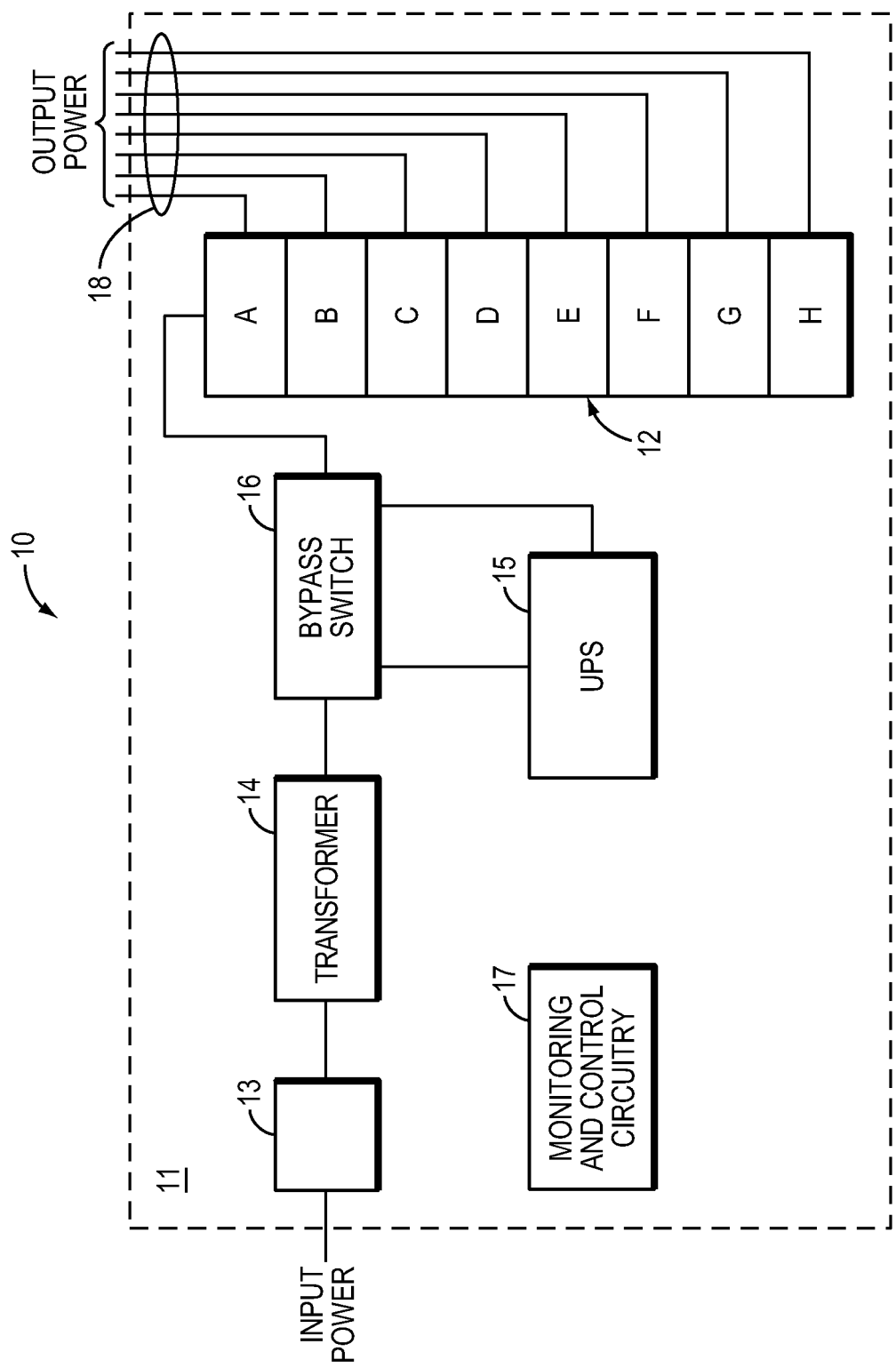
FIG. 1 illustrates a block diagram of an electrical system in which scalable power distribution equipment is employed in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Each of commonly-owned U.S. patent application Ser. No. 11/766,504, filed Jun. 21, 2007, entitled APPARATUS AND METHOD FOR SCALABLE POWER DISTRIBUTION and U.S. patent application Ser. No. 11/455,227, filed Jun. 16, 2006, entitled APPARATUS AND METHOD FOR SCALABLE POWER DISTRIBUTION describe embodiments of modular, scalable power distribution systems that provide flexibility to meet the changing electrical needs of a facility such as a data center, each of these applications is incorporated herein by reference in its entirety. The description included herein provides further embodiments of apparatus and methods for scalable power distribution, for example, embodiments that allow a user to safely adapt the configuration of the power distribution system to accommodate changing electrical loads and to do so without de-energizing the power distribution system.

FIG. 1 illustrates a power distribution system 10 in accordance with one embodiment, where the system includes a power distribution unit 11 ("PDU") that provides a plurality of output circuits 18 (e.g., branch circuits) to supply electrical power to a plurality of electrical loads, for example, loads found in a data center or another type of facility. The power distribution system 10 may include an input circuit breaker 13, a transformer 14, an uninterruptible power supply ("UPS") 15, a bypass switch 16, a bus bar assembly 12 and monitoring and control circuitry 17. In various embodiments, the PDU 11 includes the bus bar assembly 12 while each of the remaining apparatus listed in the preceding sentence may either be included in the PDU 11, or optionally, be physically located elsewhere in the power distribution system 10.

According to one embodiment, the PDU 11 includes the bus bar assembly 12 and each of the input circuit breaker 13, the transformer 14, the UPS 15, the bypass switch 16 and the monitoring and control circuitry 17, as illustrated in FIG. 1. In another embodiment, each of the input circuit breaker 13, the transformer 14, the UPS 15, the bypass switch 16 and at least a part of the monitoring and control circuitry 17 are located external to the PDU 11. In other embodiments, various combinations of the input circuit breaker 13, the transformer 14, the UPS 15, the bypass switch 16 and the monitoring and control circuitry 17 are co-located with the bus bar assembly 12 in the PDU 11. Thus, in one embodiment, the bus bar assembly 12, the input circuit breaker 13, the transformer 14, the bypass switch 16 and at least a part of the monitoring and control circuitry 17 are located in the PDU 11 while the UPS is located external to the unit 11. In yet another embodiment, the power distribution system 10 does not include a UPS. As a result, in one embodiment, the PDU 11 includes the bus bar assembly 12 and each of the input circuit breaker 13, the transformer 14, and at least a part of the monitoring and control circuitry 17, while the UPS 15 and the bypass switch 16 are not employed with the PDU 11.

According to one embodiment, the PDU 11 is contained within an equipment rack that allows the "rack mounting" of the bus bar assembly 12 and others of the apparatus included within it. In a version of this embodiment, the PDU 11 is included in a row of equipment racks that may be coupled to one another as is well known to those of ordinary skill in the art. As a result, in some embodiments, the PDU 11 includes the bus bar assembly 12, while one or more other equipment racks include others of the input circuit breaker 13, the transformer 14, the UPS 15, the bypass switch 16 and the monitoring and control circuitry 17. In versions of these embodiments, the equipment racks including the apparatus identified here are coupled together to form a row of equipment racks employed in the power distribution system 10, for example, as described in commonly assigned U.S. Pat. No. 6,967,283, entitled "Adjustable Scalable Rack Power System and Method," issued Nov. 22, 2005 to Neil Rasmussen et al. which is incorporated by reference herein. The above-described configurations describe only some of the possible configurations and are not intended to be limiting.

In accordance with one embodiment, the bus bar assembly 12 is adapted to receive at least one plug-in module that may include a switching device and overcurrent protection (e.g., an electrical isolation and overcurrent protection device), for example, a circuit breaker, a fused switch, or a separate switch and one or more fuses. In one embodiment, the plug-in module is installed in the bus bar assembly 12 to connect the bus bar assembly to the output circuits. As is described in greater detail below, in various embodiments, the plug-in module may include a pre-terminated power cable to facilitate a safe connection of new output circuits with the PDU 11 and the bus bar assembly energized. Further, in various embodiments, the bus bar assembly 12 provides a region free of uninsulated conductors in which the plug-in module is installed.

In one embodiment, the bus bar assembly 12 includes a plurality of positions A-H that are each adapted to receive a plug-in module. In a version of this embodiment, the bus bar assembly is rated for a maximum continuous current of 400 Amps while each position A-H is rated for a maximum continuous current of 100 Amps. In one embodiment, each of the plug-in modules is also rated for 100 Amps although various ampacity circuit breakers may be included in the plug-in modules, e.g., having ampacities of from less than 1 Amp up to and including a maximum of 100 Amps. Such an approach may, in various embodiments, provide a scalable system that can employ two elements (i.e., a bus bar assembly and plug-in modules) to meet a wide variety of the existing and future electrical needs of a facility. This results in efficiencies in manufacturing, supply chain and operation and maintenance for the equipment. For example, a manufacturer need not manufacture and a designer need not try to select from a plurality of semi-custom equipment. Accordingly, the equipment may have a lower cost and greater availability.

As illustrated in FIG. 1, a source of input power is connected to the line side of the input circuit breaker 13, the load side of the input circuit breaker 13 is connected to a line side (i.e., the input) of the transformer 14, the load side (i.e., the output) of the transformer 14 is connected to the input of the bypass switch 16, and the output of the bypass switch 16 is connected to the bus bar assembly 12. In one embodiment, both the input and the output of the UPS 15 are connected to the bypass switch 16. As is well known by those of ordinary skill in the art, the bypass switch 16 operates to selectively connect the output of the bypass switch 16 to either the transformer 14 or the UPS 15. In accordance with one embodiment, the bus bar assembly 12 receives the power from the bypass switch 16 and supplies power to one or more output circuits 18. In one embodiment, the bypass switch is adapted to selectively couple the output of the transformer 14 and the output of the UPS 15 to the bus bar assembly 12.

The monitoring and control circuitry 17 may perform solely monitoring functions, solely control functions or a combination of monitoring and control. In various embodiments, monitoring includes any one or any combination of the following functions and/or the following functions and additional functions: current sensing, power monitoring (e.g., energy consumption), circuit on/off sensing, bypass switch status, UPS status and the like. Any of the preceding may be accompanied by signal processing employed for the purpose of monitoring and/or control. For example, current and voltage signals may be processed to determine energy consumption. Accordingly, the monitoring and control circuitry 17 may include one or more processors, e.g., microprocessors.

In addition, the monitoring and control circuitry 17 may include communications with any of the various components included in the PDU 11. Accordingly, in some embodiments, the PDU includes circuitry (not shown) that connects the monitoring and control circuitry 17 to one or more of the bus bar assembly 12, input circuit breaker 13, the transformer 14, the UPS 15, and the bypass switch 16. Further, in various embodiments, the monitoring and control circuitry 17 may be included in or communicate with a local area network and or a wide area network (e.g., the Internet).

In further embodiments, control functions include any one or any combination of the following functions and/or the following functions and/or additional functions: control of UPS operation, control of bypass switch operation, operation of one or more circuit breakers, other switching operations and the like. Accordingly, the monitoring and control circuitry 17 may include a user interface such as a display and/or switches, meters, indicating lights, and the like.

Figure 2:
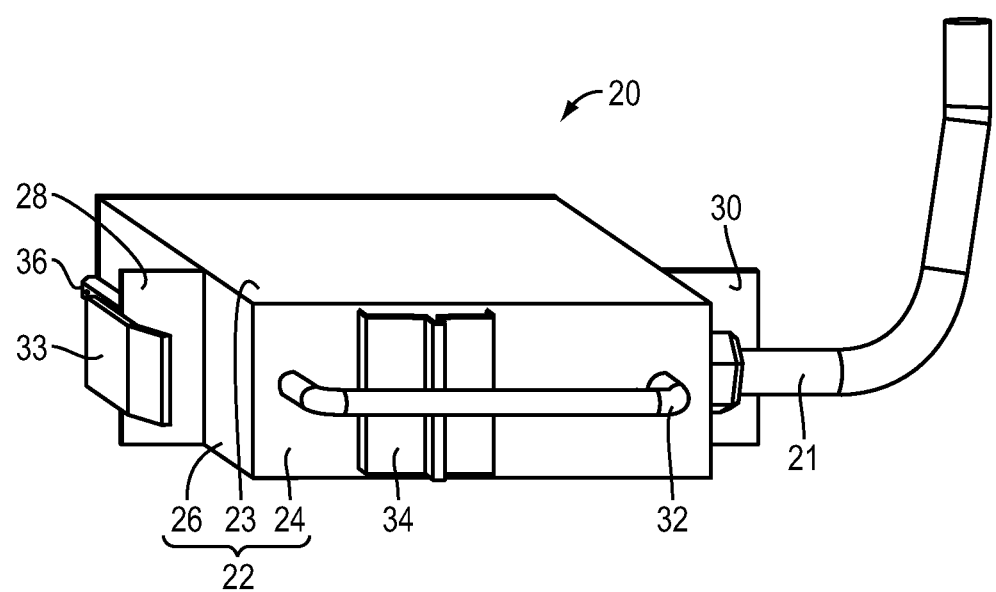
FIG. 2 illustrates an isometric view of a plug-in module in accordance with one embodiment of the invention.

Referring now to FIG. 2, an isometric view of a plug-in module 20 in accordance with one embodiment of the invention is illustrated. In general, the plug-in module 20 is employed to supply power from the PDU 11 to an electrical load. Further, in accordance with various embodiments of the invention, the plug-in module 20 includes a switching device such that a line-side of the plug-in module connects to a source of electrical power and a load side of the plug-in module 20 can be directly connected to an electrical load or connected to further circuitry that is connected to the electrical load. Thus, in one embodiment, the plug-in module 20 includes a circuit breaker that can provide electrical isolation and overcurrent protection (e.g., a miniature molded case circuit breaker that senses overloads and/or short circuits). In other embodiments, the plug-in module includes a combination of an isolation switch and fusing such as a fused disconnect switch or a combination of a switch and fuses that are separate from one another. In accordance with one embodiment, the plug-in module is sized and adapted for installation in a bus bar assembly, for example, the bus bar assembly 42 illustrated in FIG. 5. In various embodiments, the plug-in module 20 includes a power cable 21 which may include an end that is pre-terminated at the plug-in module 20.

As used herein, the term "pre-termination" refers to the fact that a first end of the power cable 21 is connected at the plug-in module 20 before the plug-in module arrives on a job site. According to one embodiment, the pre-termination is performed during the manufacture of the plug-in module 20.

In some embodiments, the length of the power cable 21 is also established during manufacture. That is, in one embodiment, a plurality of commonly used fixed lengths of power cable 21 may be available. In a version of this embodiment, the plurality of commonly used fixed lengths are established based on a distance between a first enclosure and/or equipment rack and a second enclosure and/or equipment rack. Thus, a connection between the plug-in module 20 and an immediately adjacent equipment rack may require a shorter length of cable when compared with the length of cable required for a connection between the plug-in module 20 and a more distant equipment rack. Because equipment racks are often supplied in standard sizes the length of the power cables 21 can be determined in advance. In addition, a second end of the power cable 21 may include a connector to facilitate the connection of the power cable 21 to an electrical load.

As illustrated in FIG. 2, the plug-in module 20 includes a housing 22 having a top panel 23, a front panel 24 and a first side panel 26. In various embodiments, the plug-in module 20 may also include a bottom panel, a rear panel and a second side panel (located opposite the first) which are not illustrated in FIG. 2. The housing 22 may be manufactured using any rigid material (conductive material or insulating material) suitable for use with electrical equipment, for example, the housing may be manufactured from steel. In some embodiments, portions of the housing are conductive while other portions of the housing are insulating. According to one embodiment, a first extension 28 extends from the first side panel 26 in a substantially perpendicular direction while a second extension 30 may extend from the second side panel.

In various embodiments, the plug-in module 20 may include additional features and various combinations of features. For example, according to one embodiment, the plug-in module 20 includes a handle 32 that is attached to the housing 22 (e.g., at the front panel 24) which may be employed by a user to install and remove the plug-in module 20. In some embodiments, the plug-in module 20 includes a latch 33 that secures the plug-in module 20 in a fully installed position. In the illustrated embodiment, the latch 33 is attached to an end of the first extension 28. Alternatively, a single latch 33 may be attached to an end of the second extension 30. In yet another embodiment, a separate latch 33 may be attached to each of the first extension 28 and the second extension 30.

In addition, one or more of the housing 22 and/or extensions 28, 30 may include a rejection feature to provide an interference employed to prevent the installation of a plug-in module 20 based on one or more conditions, for example, where a nominal voltage rating of the plug-in module 20 is lower than a nominal voltage rating of equipment (e.g., the bus bar assembly) in which the plug-in module is being installed, where the plug-in module is being installed up-side down, etc.

The plug-in module 20 may also include a guide element 36 which may assist in properly aligning the plug-in module 20 when it is being installed. For example, the guide element 36 may engage a corresponding part of an enclosure/rack or bus bar assembly in which the plug-in module 20 is being installed. The guide element 36 may be an integral part of the housing or a separate component. In addition, a plurality of guide elements 36 may be employed. In one embodiment, the guide element 36 is a rail located on the side panel 26 of the housing 22. In this embodiment, the guide element 36 may engage a corresponding groove in, for example, a bus bar assembly. In a further embodiment, a separate guide element 36 is included on each of the side panels. It should be apparent to those of ordinary skill in the art that the guide element or elements 26 may include structure other than a rail, for example, a tab or an extension (such as a cylindrical extension) may be employed. Further, the guide element may be located anywhere on the plug-in module 20 that will facilitate a proper alignment of the module. It should also be apparent that the guide element 36 need not extend from the plug-in module but may instead be a groove, channel, tube, hollow or other recess that engages corresponding structure extending from the bus bar assembly, enclosure and/or rack in which the plug-in module 20 is installed.

The latch 33 may include a variety of different structure that allows the plug-in module 20 to be retained in a fully-installed position, e.g., with the plug-in module 20 fully connected to the bus bar assembly 42. For example, the latch 33 may have a range of motion such that the latch 33 deflects from an at-rest position as the plug-in module 20 is installed and then captures (or is captured by) a part of the bus bar assembly and/or rack in which it is installed. As should be apparent to one of ordinary skill in the art, the latch 33 can be manufactured from flexible material and/or rigid material configured to flex in an elastic manner when pressure is applied to the latch 33.

As mentioned above, the plug-in module 20 may include a circuit breaker 34 such that the plug-in module 20 can provide overcurrent protection for the electrical load to which it is connected, e.g., it can provide overload and short circuit protection. In one embodiment, the circuit breaker 34 is located such that at least a part of the circuit breaker is accessible with the housing 22 completely assembled. For example, the front panel 24 may include an opening through which the face of the circuit breaker 34 is accessible and/or extends. Such a configuration can allow the circuit breaker status (i.e., open, closed, tripped, etc.) to be determined and also allow operating personnel to operate the circuit breaker 34.

In one embodiment, the circuit breaker 34 is a Pro-M series miniature circuit breaker manufactured by ABB. Example part numbers for IEC rated circuit breakers include: S201-K16; S201-K32; S203-K16; and S203-K32. Example part numbers for circuit breakers designed to meet traditional U.S. standards include: S201U-K20; S203U-K32; and S203U-K50. In another embodiment, the circuit breaker 34 is a L-Series miniature circuit breaker manufactured by Altech. Examples include a Catalog No. 1 CU02L rated for 0.2 Amps and single pole applications and a Catalog No. 3CU63L rated for 63 Amps and three pole applications. It should be apparent to those of ordinary skill in the art that other makes, models and configurations (e.g., four pole, six pole, etc.) can be employed. In addition, the plug-in module 20 can include a circuit breaker that complies with any applicable standard from any of a variety of standard setting bodies.

As illustrated, the power cable 21 is pre-terminated within the housing 22, however, in an alternate embodiment the power cable 21 is pre-terminated external to the housing 22. Further, where the power cable 21 is pre-terminated to the plug-in module 20, the pre-termination provides a connection between one or more of the conductors included in the power cable 21 and the circuit breaker 34. In accordance with one embodiment, the pre-termination results in the power cable 21 being directly connected to one or more terminals/lugs integral with the circuit breaker 34. However, such a direct connection is not required and various other configurations may be employed. For example, the power cable 21 may be terminated at another terminal point/lug located in the plug-in module 20. In this embodiment, a jumper or short piece of cable, wire, etc. may connect the terminal point/lug (and as a result the power cable) to the circuit breaker 21.

The plug-in module 20 may also include various control elements to provide status indications and/or allow control of, for example, the circuit breaker 34. According to one embodiment, the plug-in module 20 includes one or more status indication lights that may be located in the front panel 24 and used to indicate a circuit breaker status. In another embodiment, the plug-in module 20 may include a relay that can be employed to open the circuit breaker to disconnect the load being supplied by the plug-in module 20 as part of a load shedding scheme. In addition, the circuit breaker or other isolating means may be electrically operated such that is can be electrically opened, closed and reset. The plug-in module 20 may also include an auxiliary switch or one or more voltage sensors to determine the position of the poles of the circuit breaker, the status of switch contacts or the status of fuses.

Further, the plug-in module 20 may also include one or more temperature sensors to provide data concerning, for example, the temperature of contacts that connect the plug-in module 20 to the bus bar assembly 12, the temperature of circuit breaker and/or the temperature of the circuit breaker terminals/lugs. In some embodiments, the preceding approach may be employed to reduce or eliminate the need to perform IR scanning for over temperature conditions. In one embodiment, the preceding approach provides data that is employed to supplement IR scanning, for example, to identify areas of interest.

Figure 3:
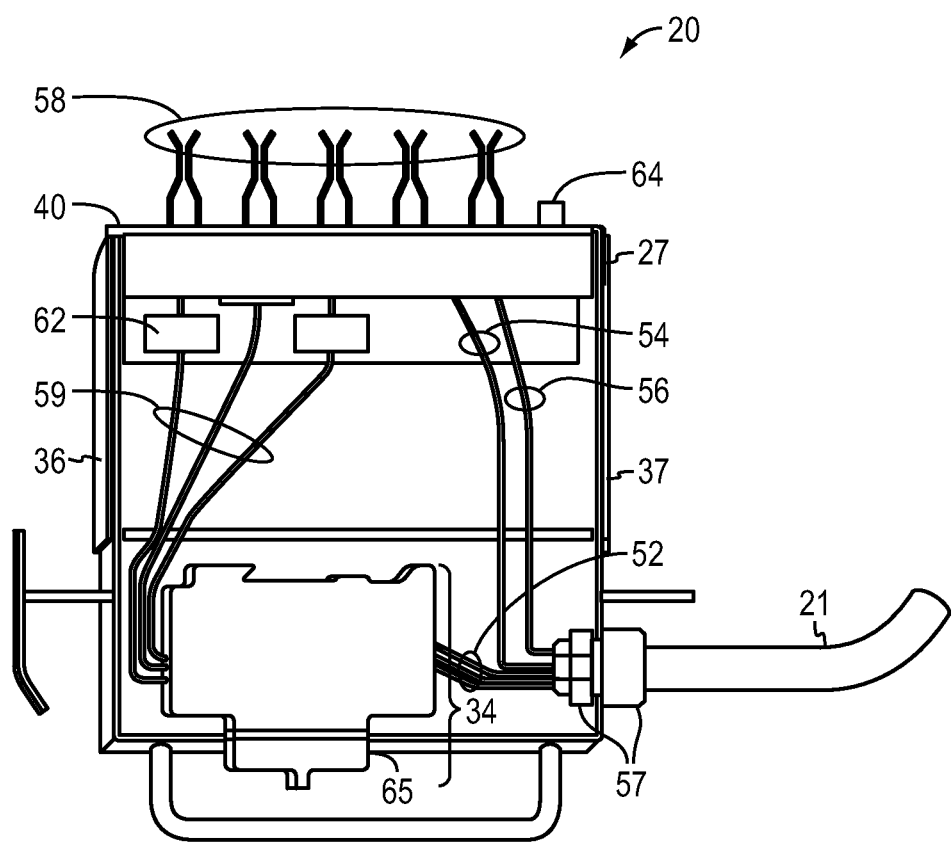
FIG. 3 illustrates a plan view of a plug-in module in accordance with one embodiment of the invention.

FIG. 3 illustrates a plan view of the plug-in module 20 of FIG. 2 with the top of the housing (e.g., a top panel) removed. A second side panel 27 and a rear panel 40 included as part of the housing 22 are illustrated in FIG. 3. In addition to the housing 22, the power cable 21 and the circuit breaker 34, e.g., a molded case circuit breaker, the plug-in module 20 includes line conductors 52, a neutral conductor 54, a ground conductor 56 and a plurality of contacts 58. In accordance with one embodiment, the power cable 21 includes each of the line conductors 52, the neutral conductor 54, and the ground conductor 56. In one embodiment, additional line conductors 59 connect the circuit breaker 34 to the contacts 58. Further, in one embodiment, each line conductor 59 is ultrasonically welded to the corresponding contact of the plurality of contacts 58. As should be apparent to those of ordinary skill in the art, other configurations of the power cable may be employed, for example, the power cable 21 may not include a neutral when the plug-in module 20 is connected to a 3-wire load. As illustrated in FIG. 3, in some embodiments, the power cable 21 may have the line conductors 52 pre-terminated at the circuit breaker while the neutral conductor 54 and the ground conductor 56 are terminated elsewhere in the plug-in module 20.

In accordance with one embodiment, the plug-in module 20 includes a mechanical stress relief device 57 for the power cable 21. That is, the plug-in module 20 includes a device to reduce any forces that may tend to pull the pre-terminated power cable 21 from the plug-in module 20. According to one embodiment, the mechanical stress relief device 57 includes an internal bushing, an external bushing, other hardware, or a combination of any of the preceding. In one embodiment, the mechanical stress relief device 57 is a type of stress relief device that is also suitable for use with twist lock cord end connectors. In a version of this embodiment, the mechanical stress relief 57 is a strain relief device provided by Hubbell Incorporated, for example, a model that is approved by Underwriter's Laboratory. According to one embodiment, the mechanical stress relief 57 is overmolded onto the power cable 21 where the power cable 21 includes three single phase power cords.

In addition, in one embodiment, the plurality of contacts 58 are located outside the housing proximate the rear panel 40. In one embodiment, each of the electrical contacts include a pair of contact "fingers" sized and adapted to engage a bus bar with a proper amount of tension to create a stable electrical connection when the plug-in module 20 is inserted in the bus bar assembly 42, e.g., the contacts provide sufficient pressure to prevent the connection with the bus bar from overheating when current is being carried by the plug-in module. As should be apparent, other configurations of the plurality of contacts 58 may be employed so long as the contacts 58 are adapted to removably engage corresponding stationary contacts and/or contact surfaces. Stationary conductors, stationary contacts and stationary contact surfaces have fixed positions that cannot be moved when the PDU is in service, i.e., when the PDU is energized. In the illustrated examples, a bus bar can be a stationary conductor that provides a stationary contact surface. In a version of this embodiment, the neutral conductor 54 and the ground conductor 56 are pre-terminated at the corresponding contacts 58, respectively. According to one embodiment, the contacts 58 are manufactured from copper with a 2-3 micron coating of nickel and a tin plating finish. In a further embodiment, contact pressure is assisted by a spring clip, for example, a spring clip manufactured from carbon steel or stainless steel.

In one embodiment, the plug-in module 20 also includes a plurality of current sensing devices 62, for example, current transformers ("CTs"). According to one embodiment, the plug-in module 20 includes a separate current sensing device 62 for each line conductor. Thus, according to one embodiment, the plug-in module 20 is employed with a three phase circuit and includes three CTs. Of course, other configurations may be used, for example, the plug-in module may also include a fourth CT for sensing neutral current. A wide variety of current sensing devices may be employed provided that they include a suitable current rating and physical dimensions that allow them to be installed within the housing 22 of the plug-in module 20. Example current sensors include: a part no. 5304 from Amecon Inc.; a part no. T75001 from Falco Electronics, LTD.; and a part no. 460-1001 A from Shilcharpayton Technologies, LTD.

In accordance with one embodiment, the plug-in module 20 includes a connector 64 sized and adapted for connecting one or more secondary circuits to circuitry located external to the plug-in module 20 when the plug-in module is installed in the bus bar assembly 42. Secondary circuits can include any monitoring and/or control circuits including circuits that employ the output of the current sensors. Accordingly, the connector 64 may be employed to connect secondary circuits or portions thereof included in the plug-in module 20 to secondary circuitry included in the monitoring and control circuitry 17.

In various embodiments, the connector 64 includes at least one contact which is configured to engage a corresponding contact (not shown) included in the bus bar assembly. As should be apparent to those of ordinary skill in the art, that various styles and types of contacts may be employed provided that the contacts and connector are rated for the nominal operating voltage and nominal current of the secondary circuit or circuits. According to one embodiment, the connector 64 extends from within the housing 22 through the rear panel 40. In one embodiment, the connector 64 is adapted to mate with an edge connector included in the bus bar assembly 42. Example connectors include: a part no. 5-5530843-0 from Tyco Electronics Corp.; and a part no. 2551-20D from Ito-Chien Enterprise Co. Ltd.

In accordance with one embodiment, a part 65 of the circuit breaker 34 externally accessible (i.e., accessible outside the housing 22) is illustrated. In addition, FIG. 3 illustrates the use of the guide element 36 (i.e., a first guide element) and a second guide element 37.

Figure 4:
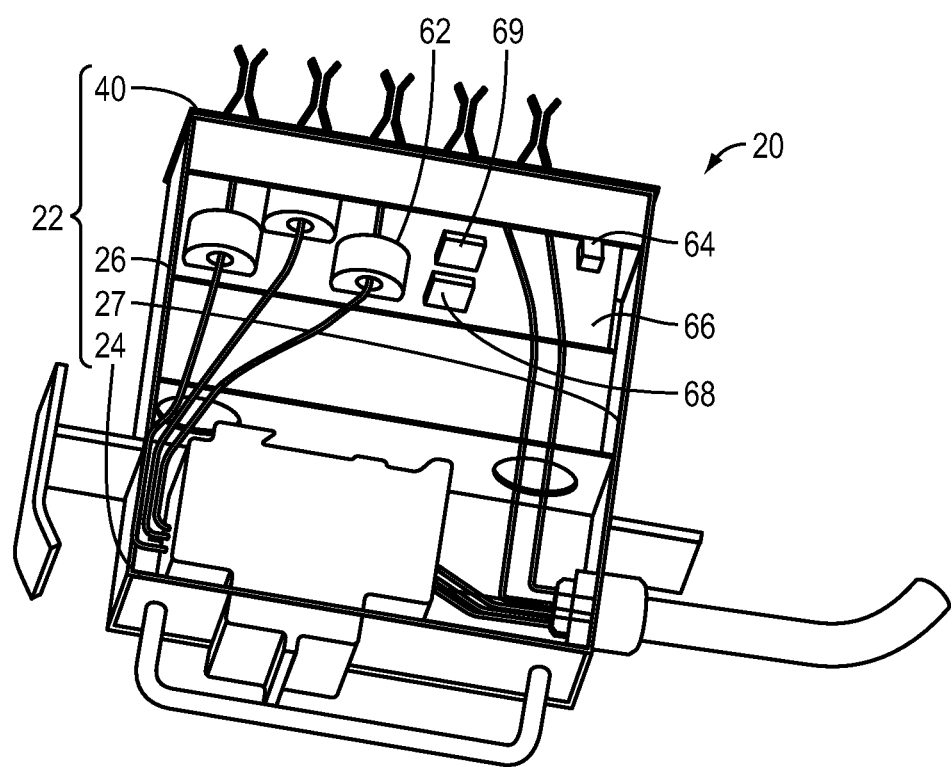
FIG. 4 illustrates an isometric view of the plug-in module of FIG. 3 in accordance with one embodiment of the invention.

Referring now to FIG. 4, an isometric view of the plug-in module of FIG. 3 is illustrated. As illustrated here, each of the three current sensors 62 is clearly shown. In accordance with one embodiment, the current sensors 62 are included on a printed circuit board ("PCB") 66 located within the housing 22. In addition, the portion of the connector 64 located within the housing 22 is illustrated. In accordance with one embodiment, the connector 64 is also coupled to the PCB 66 within the housing. In a version of this embodiment, at least some of the contacts within the connector 64 are connected to circuitry located on the PCB 66.

In some embodiments, the secondary circuitry located in the plug-in module 20 does not include a processor or any control functions, for example, the secondary circuitry may simply provide the output of the sensing devices to the connector 64. The outputs may then be communicated to the monitoring and control circuitry 17 via the connector 64 when the plug-in module is installed in the bus bar assembly 42. In alternate embodiments, the secondary circuitry includes a processor 68 (e.g., a microprosessor), for example, located on the PCB 66. In versions of these embodiments, the processor 68 may be employed to perform either monitoring, control functions or both. Further, the processor 68 can be included in the monitoring and control circuitry 17 when the plug-in module is installed in the PDU 11.

In one embodiment, the plug-in module 20 includes a memory 69 (e.g., RAM, ROM, etc.) that stores information, for example, information concerning the plug-in module 20. The information may include the ampacity of the plug-in module 20, the quantity of poles, the date of manufacture, the manufacturing facility, authenticity codes, the size of the conductors included in the power cable 21, the style of the power cable 21, the length of the power cable 21 and other information. According to one embodiment, the plug-in module 20 is programmed with the preceding information at the time of manufacture. Further, where the plug-in module 20 communicates with a communication network (for example, via the connector 64) the information can be employed to automatically set up and provide information concerning the plug-in module 20 to a power distribution monitoring system. In one embodiment, the memory 69 is included in a chip, for example, an EPROM chip.

Figure 5:
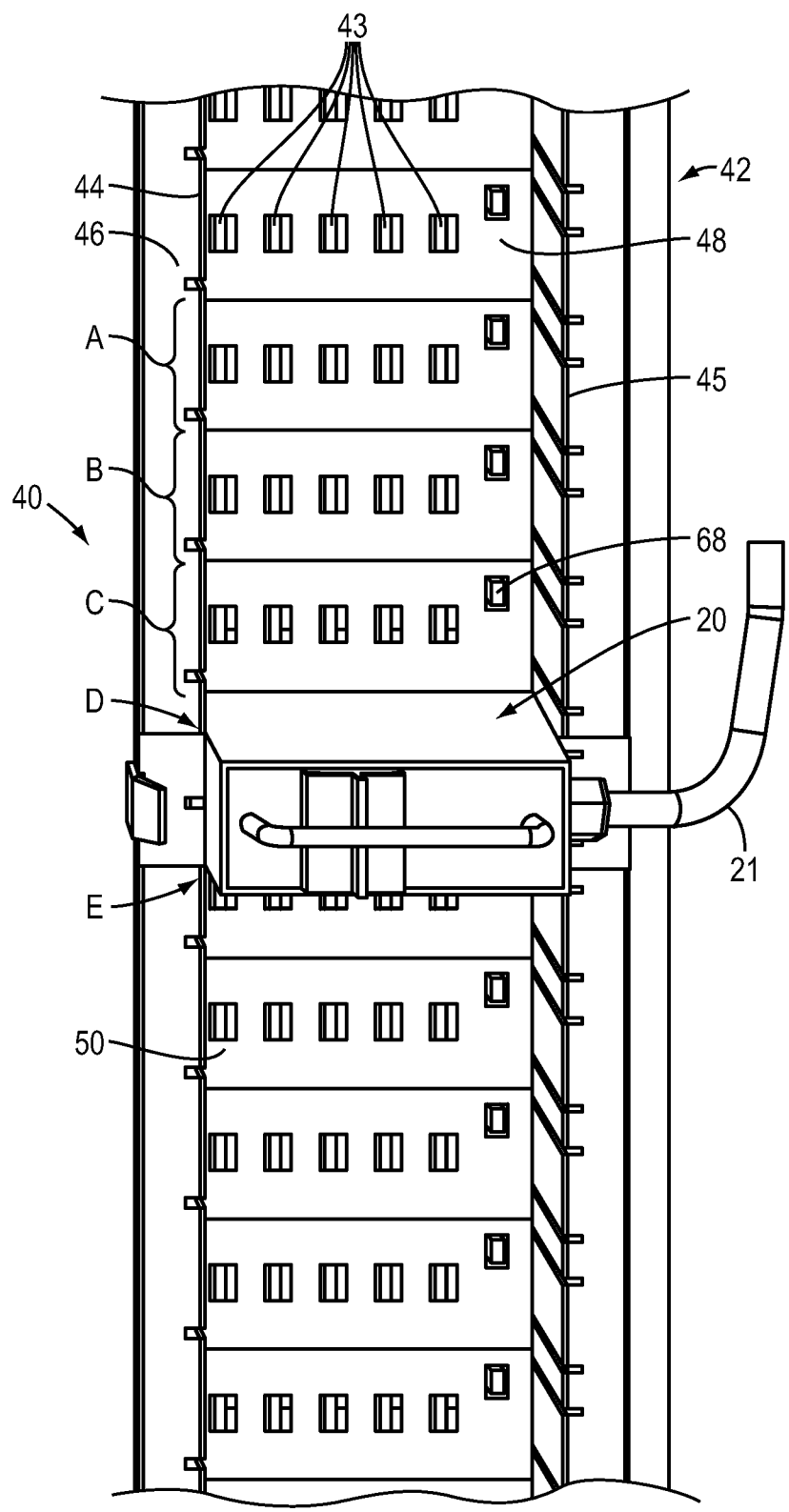
FIG. 5 illustrates a plug-in module installed in a bus bar assembly in accordance with one embodiment of the invention.

As mentioned previously, the plug-in module may be installed in a bus bar assembly, for example, the bus bar assembly 12 located in PDU 11. Referring now to FIG. 5, a system 40 is shown in which the plug-in module 20 is installed in a bus bar assembly 42 at a first position, i.e. position D. In accordance with the illustrated embodiment, the bus bar assembly includes a plurality of positions in which separate plug-in modules may be installed. In the interest of clarity, only 5 of the available positions are uniquely identified, positions A, B, C, D, and E, with position E being the position immediately below the position in which the plug-in module 20 is installed, position C being above and immediately adjacent position D and each of positions A and B being located further above position D.

In one embodiment, the bus bar assembly 42 includes a plurality of bus bars 43 and the plug-in module 20 is installed by sliding the module into the bus bar assembly 42 to engage electrical contacts 58 at the rear of the plug-in module 20 with the bus bars 43. In one embodiment, bus bar assembly includes a first side panel 44 and a second side panel 45. The side panels 44, 45 may each be a single unit, or alternatively, may each include a plurality of side panels. For example, the side panels 44, 45 may include a separate side panel for each of the plurality of positions, e.g., the positions A-E. The side panels 44, 45 may be manufactured using any rigid material (conductive material or insulating material) suitable for use with electrical equipment, for example, the side panels 44, 45 may be manufactured from steel. In another embodiment, the side panels 44, 45 are manufactured from insulating material. Either or both of the side panels 44, 45 may include a guide element 46 that is used to properly position and guide the plug-in module 20 as it is installed.

The bus bar assembly 42 may also include a rear panel 48 that provides an electrically insulating barrier between the region where the plug-in module(s) are located and the location of the bus bars 43. In one embodiment, the rear panel 48 is made of plastic. In accordance with one embodiment, the rear panel 48 includes a plurality of openings 50 that are sized and adapted to allow the electrical connection to be made with the plug-in module 20 but are small enough to prevent the accidental contact of a user and/or hand tools with the bus bar.

In some embodiments, the rear panel 48 includes a connector 68 that can be employed to connect the monitoring and control circuitry 17, or a portion thereof, to secondary circuitry included in the plug-in module 20.

The plug-in module 20 may include single pole circuit breakers or multi pole circuit breakers in various embodiments. In some embodiments, the circuit breaker is a three pole circuit breaker while in other embodiments, the circuit breaker is a six pole circuit breaker.

The power cable 21 may also include a variety of embodiments depending upon the load that is being supplied by the plug-in module 20. For example, the plug-in module 20 may supply either a single phase load, multiple single phase loads or three phase load. In addition, the second end of the power cable 21 (i.e., the end that is not pre-terminated) may include a connector.

Figure 6:
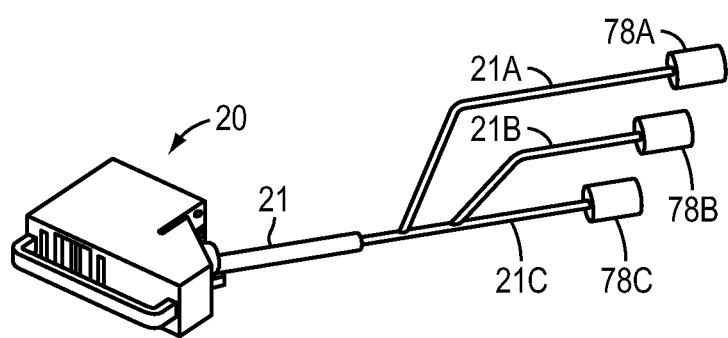
FIG. 6 illustrates a plug-in module in accordance with yet another embodiment of the invention.

FIG. 6 illustrates an embodiment where a plug-in module 20 includes a power cable 21 that is split into a plurality of branch cables 21A, 21B, and 21C. In one embodiment, the plug-in module 20 is a three phase module and the power cable 21 includes conductors for all three phases. Each of the three phases may be split into branch cables 21A, 21B and 21C, one phase per branch cable. In a further embodiment, however, three single pole circuit breakers (e.g., three circuit breakers 34) are included in the plug-in module and the power cable 21 is split into the three branch cables where the first branch cable 21A includes a single phase supplied by one single pole breaker, the second branch cable 21B includes another single phase supplied by another single pole breaker, and the third branch cable 21C includes the remaining single phase supplied by the third single pole breaker. The immediately preceding approach can save space by allowing three separate branch circuits to be supplied via a single plug-in module.

In one embodiment, each of the three branch cables 21A, 21B, 21C includes a connector 78 that can be plugged into an equipment rack. In another version, the power cable includes a three phase connector. Any of a variety of connectors may be employed including NEMA L21-20, L5, L6, L14, and L15 connectors, type CS50 connectors, IEC309 pin and sleeve devices, etc.

The preceding architecture may be employed to supply equipment racks that are adjacent a PDU in which the plug-in module 20 is installed. In one embodiment, the power cable 21 is connected to a three phase equipment rack (i.e., a rack that includes three phase load). In another embodiment, the first branch cable 21A is connected to a first equipment rack, the second branch cable 21B is connected to a second equipment rack, and the third branch cable 21C is connected to a third equipment rack where each of the first, second and third equipment racks are single phase equipment racks (i.e., racks that only require single phase power.)

Further, the power cable 21 may be supplied in fixed lengths that are established when the equipment is ordered, for example, where the dimensions of a plurality of equipment racks with which the plug-in module 20 is employed are known, a pre-determined length may be accurately determined for the power cable 21 that is to connect the plug-in module 20 to equipment in another rack.

Figure 7:
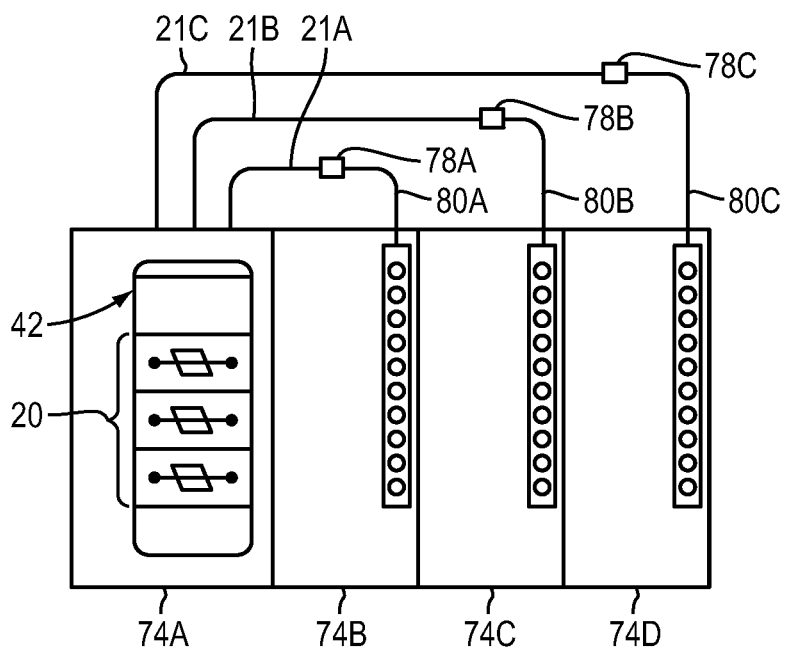
FIG. 7 illustrates a block diagram of a bus bar assembly and plug-in modules in accordance with an embodiment of the invention.

FIG. 7 illustrates an embodiment that employs a plurality of adjacent equipment racks including a first rack 74A which includes a bus bar assembly 42 and plug-in modules 20. One or more additional equipment racks are also included, i.e., a second rack 74B, a third rack 74C and a fourth rack 74D. According to one embodiment, one or more of the racks 74B, 74C and 74D include electrical load that is supplied power via the plug-in module 20. In a further embodiment, the first rack 74A includes a UPS that supplies power to the bus bar assembly 42. As a result, the load supplied via each of the plug-in modules 20 is also supplied power from the UPS.

In accordance with one embodiment, the plug-in modules 20 include pre-terminated power cables 21 which may each include a connector 78. For example, the equipment racks 74B, 74C and 74D may each include single phase load that are connected to the plug-in modules 20 via the cables 21A, 21B and 21C, respectively. Alternatively, or in combination with the preceding, one or more of the cables 21A, 21B and 21C may supply polyphase power (e.g., three phases) to one or more of the equipment racks 74B, 74C and 74D.

Each of connectors 78A, 78B and 78C may connect the power cable 21 to a power cable 80A, 80B, and 80C associated with one of the equipment racks 74B, 74C and 74D, respectively. Thus, in some embodiments, the power cables 80A, 80B and 80C complete the electrical connection between the plug-in modules 20 and the equipment rack that is receiving power from the plug-in modules 20. In addition, the connectors 78A, 78B and 78C may be connected to a corresponding connector (not illustrated) attached to the end of the power cables 80A, 80B and 80C.

FIG. 7 illustrates one example of a power distribution system architecture employing the bus bar assembly 42 and plug-in modules 20, however, various embodiments of the invention support other configurations. Additional equipment, for example, UPS batteries may be included in the equipment rack 74A. In some embodiments, the power cables 21 may be connected to remote equipment racks. Further, the remote equipment racks may include an additional bus bar assembly and plug-in modules. That is, in one embodiment, a plug-in module in a first bus bar assembly may supply power to a second bus bar assembly. In another embodiment, a bus bar assembly and plug-in modules may be located in an equipment rack where all the electrical load that is supplied power by the plug-in modules is located in one or more remote equipment racks. Other combinations of the above configurations and combinations of the above and different configurations may also be employed.

In various embodiments, one or more receptacle outlets may be included at the second end of the power cable. A receptacle outlet provides for a direct connection to power utilization equipment such as rack mounted equipment (e.g. switches, routers, hubs, patch panels, servers and server equipment racks/blade server chassis), desktop computers, printers, HVAC equipment, motors, etc. In an embodiment, this direct connection is established by physically mating a receptacle outlet to an attachment plug of the power utilization equipment. As is discussed further below, receptacle outlets may conform to various standards for size, shape, pin-count, voltage, amperage, and phase. Further the receptacle outlets may be configured in a "female" configuration (as illustrated herein) or in a "male" configuration so long as the receptacle outlet is configured to connect to a corresponding connector of the power utilization equipment.

Each of the embodiments described with regard to FIGS. 15-17 below may be installed using a similar technique. In this technique, the plug-in module 20 is connected to the power distribution system and the power cable 21 may be installed by running the cable 21 through an overhead cable management system. Further, the one or more receptacle outlets may be feed into an equipment rack and attached to it or the equipment it houses by using keyhole connectors, magnets, VELCRO® Brand hook and loop fasteners or other fastening hardware. The one or more receptacle outlets may include a flange to facilitate this attachment. Using the plug-in module 20 in this fashion may decrease the rack space required by the power distribution system. Furthermore, providing for factory assembled plug-in modules connected to one or more receptacle outlets may decrease the need for field wiring and thus decrease downtime and/or required hot work.

Figure 8:
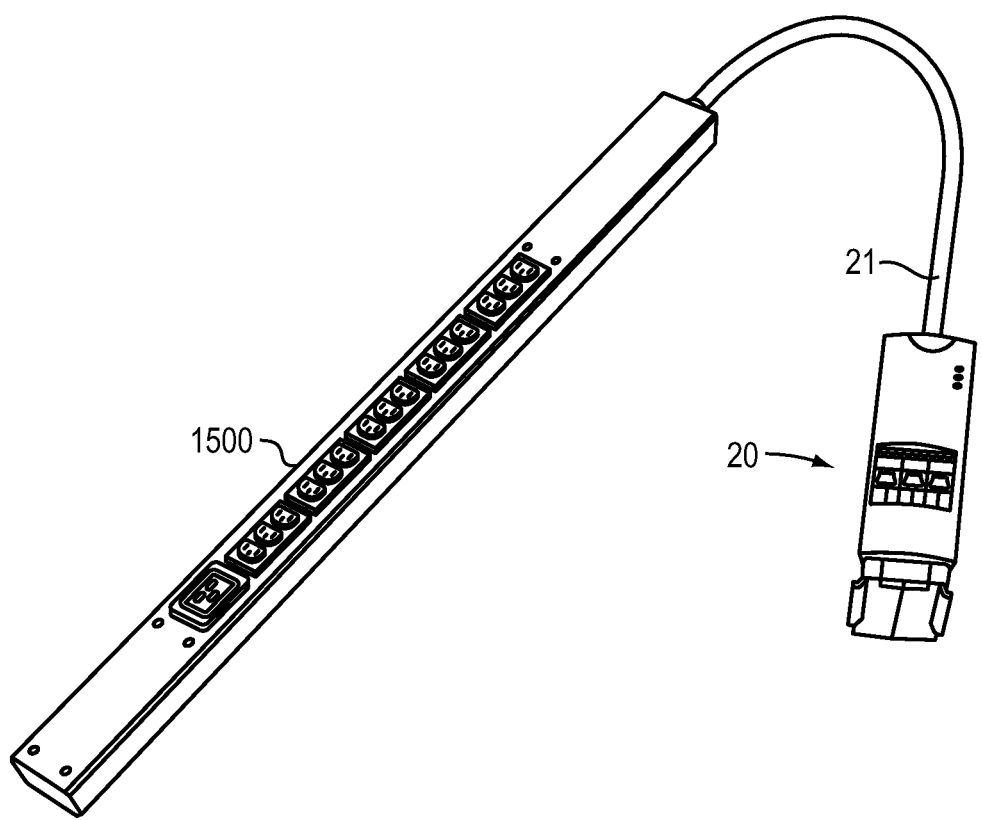
FIG. 8 illustrates a plug-in module in accordance with still another embodiment of the invention.

For example, FIG. 8 illustrates an embodiment where a plug-in module 20 includes a power cable 21 that is connected to a rack mountable power distribution unit ("RMPDU") 1500, e.g. a "power strip" including fastening hardware/ structure that allows the power strip to be secured in an equipment rack, which may include multiple receptacle outlets. As can be seen in FIG. 8, the plug-in module 20 connects to the power cable 21 and the power cable 21 connects to the RMPDU 1500. The plug-in module 20, the power cable 21 and the RMPDU 1500 may support single phase or three phase power distribution. The RMPDU 1500 may include one or more outlets.

In various embodiments, power utilization equipment, such as rack mountable equipment, may be plugged directly into the RMPDU 1500. In this example, the RMPDU 1500 may include any receptacle outlet or combination of receptacle outlets including IEC 320 C13, C19 and NEMA L6-20, among other styles and types of IEC and NEMA connectors. The receptacle outlets may have various voltage ratings such as, for example, 120V, 240V and/or 415V and various amperage ratings such as, for example, 12 A, 15 A, 16 A, 24 A and/or 32 A. Further, the receptacle outlets may provide connections configured for a single phase or a multi-phase (e.g. three phase) circuit. Embodiments of the preceding approach to distributing power to rack mounted equipment may result in a reduced number of connections, reduce the space required for the power distribution system and reduce the need for field wiring. In addition, the resulting installation may be completed at a lower cost with a higher degree of safety.

In one embodiment, the RMPDU may include indicia adjacent to the receptacle outlet(s) to indicate the ampacity of the outlet and/or the lines (e.g., phases) of a multi-phase power source that are connected to the outlet. Further, groups of multiple receptacle outlets may be associated with a first common connection L1-L2, while another group of receptacle outlets in the same RMPDU may be associated with a second common connection L2-L3. In one version, indicia associated with each group, respectively, which appears on the RMPDU provides information concerning the line connections.

The RMPDU 1500 may include a display, not shown, that provides information regarding the plug-in module 20. For example, where the plug-in module supports three phase power distribution, the display may provide information regarding the amount of load being supplied by each of the phases, for example, information provided by one or more current sensors. This information can be used, for example, to balance the load across the three phases when connecting power utilization equipment. That is, in one embodiment, a display, e.g., a display integral to the RMPDU, is used to monitor the load on a plurality of phases connected to the RMPDU, as each piece of utilization equipment is connected to the RMPDU. The user may select one of a plurality of receptacle outlets included in the RMPDU to which additional power utilization equipment should be connected based on the loading, e.g. the current draw, of each phase included in the RMPDU. In one embodiment, the user employs the indicia when selecting the receptacle outlet.

In another embodiment, a mobile computing device may provide information concerning the plug-in module 20. For example, scannable identification (such as IR-scannable identification, e.g., bar code labels, etc.) may be affixed to the plug-in module 20 and/or RMPDU in which the plug-in module is installed (or will be installed). According to one embodiment, the mobile computing device can be used to scan the identification and then, based on the identification information, provide a user of the computing device with the loading of the plug-in module 20 and/or RMPDU on a per-phase basis. In one version, the user can then determine where to connect additional load based on this information. In another version, the mobile computing device may use this information to identify and recommend to the user specific rack and/or receptacle outlet connections that should be used to supply additional power utilization equipment. For example, to maintain a substantially balanced loading, the mobile computing device may use an amount of load being supplied by each phase of the RMPDU to determine the receptacle outlet to which additional power utilization equipment should be connected.

Figure 9:
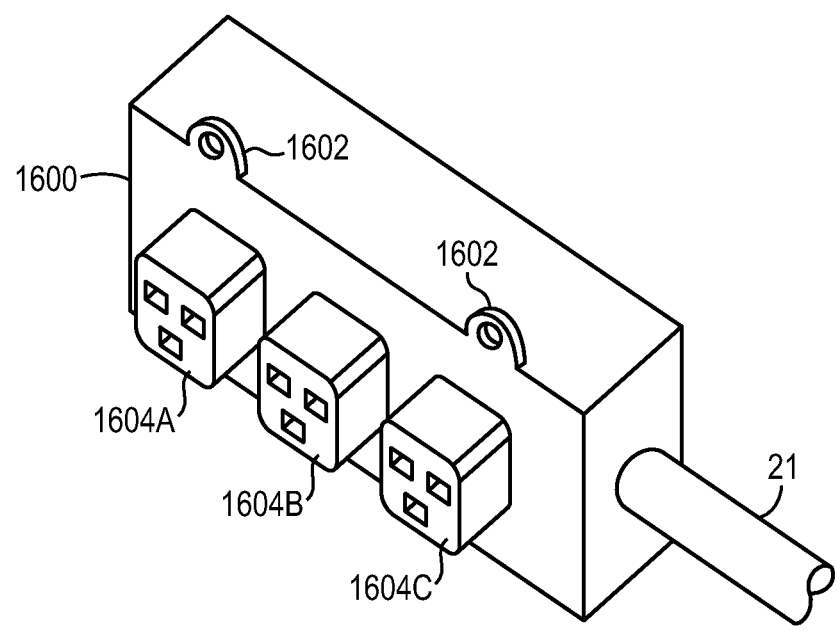
FIG. 9 illustrates a plug-in module in accordance with yet another embodiment of the invention.

FIG. 9 illustrates another embodiment in which the power cable 21 may supply one or multiple receptacle outlets. The depicted embodiment includes a housing 1600 and a plurality of receptacle outlets 1604A, 1604B and 1604C. An end of a power cable 21, is connected to the plurality of receptacle outlets 1604A, 1604B and 1604C within the housing 1600. In accordance with one embodiment, a second end of the power cable is connected to a plug-in module.

In one embodiment, receptacle outlets 1604A, 1604B and 1604C, respectively, are located in separate receptacle outlet cavities (not shown) in the housing 1600. In the illustrated embodiment, the housing 1600 includes flange 1602, which may be used to prevent unwanted movement of the housing after installation, so that a positive electrical connection of the receptacle outlets and corresponding utilization equipment may be maintained. That is, in accordance with one embodiment, a fastener may be inserted through a hole in the flange 1602 and secured to the power utilization equipment, or component thereof.

Further, the embodiment illustrated in FIG. 9 may allow rack space to be conserved. For example, the receptacle outlet cavities may be spaced to align with corresponding attachment plugs of the power utilization equipment. This embodiment may be used to directly connect and supply power to one or more server equipment racks, such as a blade server chassis, via the receptacle outlets 1604A, 1604B, 1604C, i.e. without the need for additional cabling. Thus, in some embodiments, the plug-in module 20 may be coupled to a set of receptacle outlets configured for a specific application. Further, various embodiments, may also provide for an uninterrupted electrical connection from the plug-in module to the power utilization equipment while greatly reducing the amount and complexity of any field wiring. In various embodiments, the housing 1600 encloses the termination and/or connections of the cable 21 to the respective outlet receptacles 1604A, 1604B and 1604C.

Figure 10:
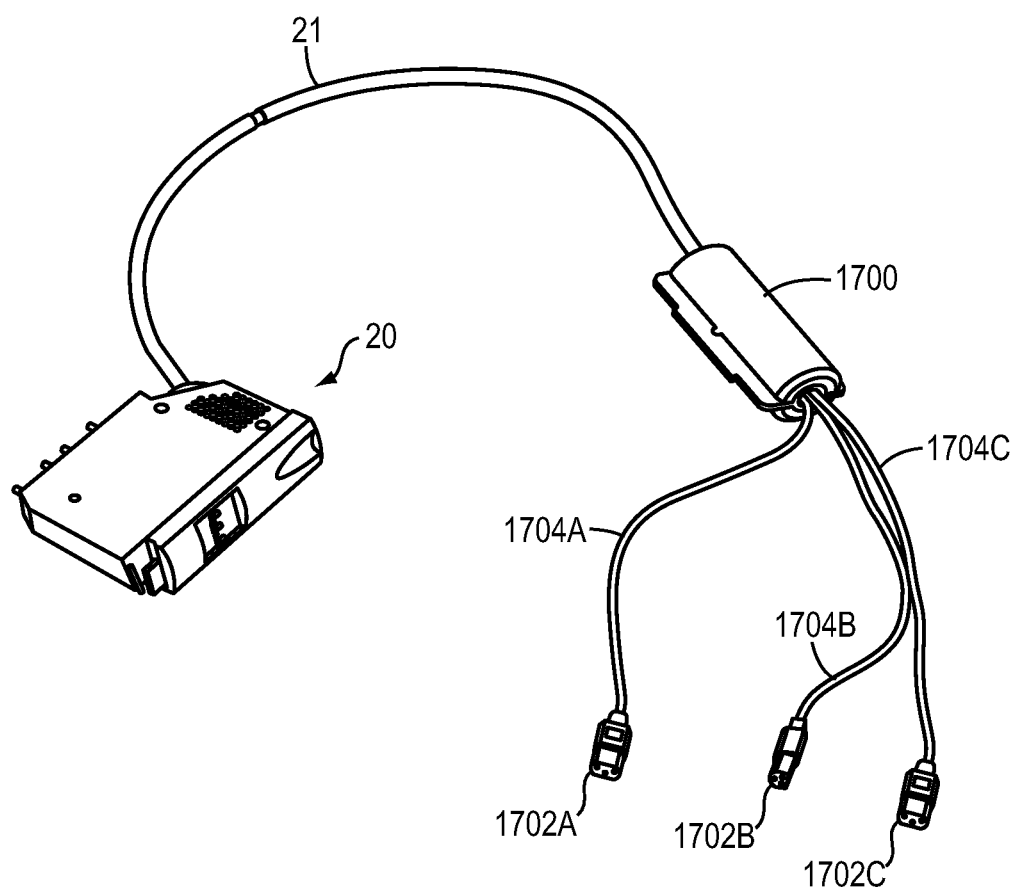
FIG. 10 illustrates a plug-in module in accordance with still another embodiment of the invention.

FIG. 10 illustrates an embodiment where a plug-in module 20 includes a power cable 21, a junction 1700 and separate cables 1704A, 1704B and 1704C each connected to separate receptacle outlets 1702A, 1702B and 1702C, respectively. As shown in FIG. 10, the plug-in module 20 connects to the power cable 21 which includes the junction 1700. In accordance with one embodiment, the junction 1700 is a location of the power cable 21 at which the power cable is split into the separate cables 1704A, 1704B and 1704C, respectively. In the illustrated embodiment, separate receptacles outlets 1702A, 1702B and 1702C are located at the end of the separate cables 1704A, 1704B and 1704C, respectively. Thus, in accordance with one embodiment, the power cable 21 includes a first end connected to an overcurrent protection device, and a second end, a third end, and a fourth end at which the receptacle outlets 1702A, 1702B and 1702C are located, respectively. In various embodiments, the plug-in module 20 illustrated in FIG. 10 may support single phase or multi-phase power distribution.

In a further embodiment, power utilization equipment, including rack mounted equipment, may be plugged directly into the receptacle outlets 1702A, 1702B and 1702C. In this example, the receptacle outlets 1702A, 1702B and 1702C may include any receptacle outlet including IEC 320 C13, C19 and NEMA L6-20, among other IEC and NEMA connectors. The receptacle outlets may have various circuit voltage ratings such as, for example, 120V, 240V and/or 415V and various circuit amperage ratings such as, for example, 12 A, 15 A, 16 A, 24 A and/or 32 A. Further, the receptacle outlets 1702A, 1702B and 1702C may support connections to single phase or multi-phase (e.g. three phase) systems. This embodiment can provide for increased flexibility in supplying power to utilization equipment that may or may not be co-located with one another, e.g., in the same equipment rack. Thus, this embodiment may result in a reduced number of connections, reduce the space required for the power distribution system and reduce the need for field wiring when supplying power to individual pieces of electrical equipment regardless of whether or not the electrical equipment is rack mounted.

In various embodiments, the architecture provided by the bus bar assembly 42 and the plug-in modules 20 allows for a scalable power distribution system that can more easily adapt to changes in the electrical requirements of the facility (e.g., a data center) where it is installed. In particular, the architecture may allow a facility to safely add new output circuits without the need for a power outage.

Further, in accordance with one embodiment, the architecture provides a standardized set of equipment ratings that can be employed in a wide variety of applications. As a result, manufacturers, equipment designers and facility operators can more easily and more economically supply power distribution equipment, design scalable and adaptable power distribution systems, and maintain and expand power distribution systems. That is, a very few "core" elements may be employed to supply power to a wide variety of dynamic electrical loads.

The plug-in module 20 may include any of a variety of switching devices, however, where the plug-in module includes a circuit breaker, the circuit breaker may have any of a wide range of continuous current ratings. This approach provides a system that is highly adaptable. For example, the plug-in module may be standardized for a specific maximum continuous current rating (e.g., 100 Amps). In one embodiment, the standardized continuous current rating is the result of a selection of the plurality of contacts 58 and other conductors integral to the plug-in module, i.e., to provide hardware that is rated for a minimum of 100 Amps. In addition, the sizing of the housing 22 may be selected such that it is sufficient to receive the largest molded case circuit breaker included in the available range of continuous current (e.g., 0-100 Amps). According to one embodiment, the plug-in module is sized and adapted to receive circuit breakers configured for mounting on a DIN rail, for example, circuit breakers with a continuous current rating of from fractions of an Amp to 63 Amps. According to one embodiment, a DIN rail is located within the housing 22 and the circuit breaker 34 is mounted on the rail. In one embodiment, the form factor across the entire range of current ratings is the same.

Various embodiments may integrate features of the plug-in module 20 into a circuit breaker 34 (e.g., into the molded housing of a molded case circuit breaker) such that the circuit breaker 34 can be installed in the bus bar assembly 42 in the manner described herein for a plug-in module 20. For example, a circuit breaker may be equipped with a plurality of contacts 58 and the circuit breaker 34 and circuit breaker housing may include any of or any combination of the guide element 36, the stress relief device 57, the connector 64, the handle 32, the latch 33, the PCB 66, the processor 68, the memory 69 and the interlock 84. In one embodiment, the housing 22 of the plug-in module is eliminated as described here. In one embodiment, the circuit breaker 34 is sized and adapted to be directly installed in the bus bar assembly 42 without a separate housing 22. Alternatively, some of the features described as being in the housing 22 may instead be included in a circuit breaker that is installed in the housing 22 of the plug-in module 20.

The overall electrical ratings of the plug-in module 20 and the bus bar assembly 42 may also be standardized to a very few ratings that each meet of a wide variety of applications. In some embodiments, the standardized hardware is approved by one or more of UL, CSA and VDE. In one embodiment, the standardized hardware includes a first set of plug-in modules 20 and bus bar assemblies 42 rated for 208/120 Volt applications, a second set rated for 415/240 Volt applications and a third set rated for 400/230 Volt applications. In each of the preceding embodiments, the bus bar assembly 42 may include a single standardized continuous current rating of 400 Amps. As mentioned previously, such an approach simplifies the manufacturing, distribution, selection and application of the power distribution equipment.

In various embodiments, the electrical isolation and overcurrent protection may include any one of or any combination of circuit breakers, trip elements, fuses and switchable contacts (e.g., switches).

Figure 11:
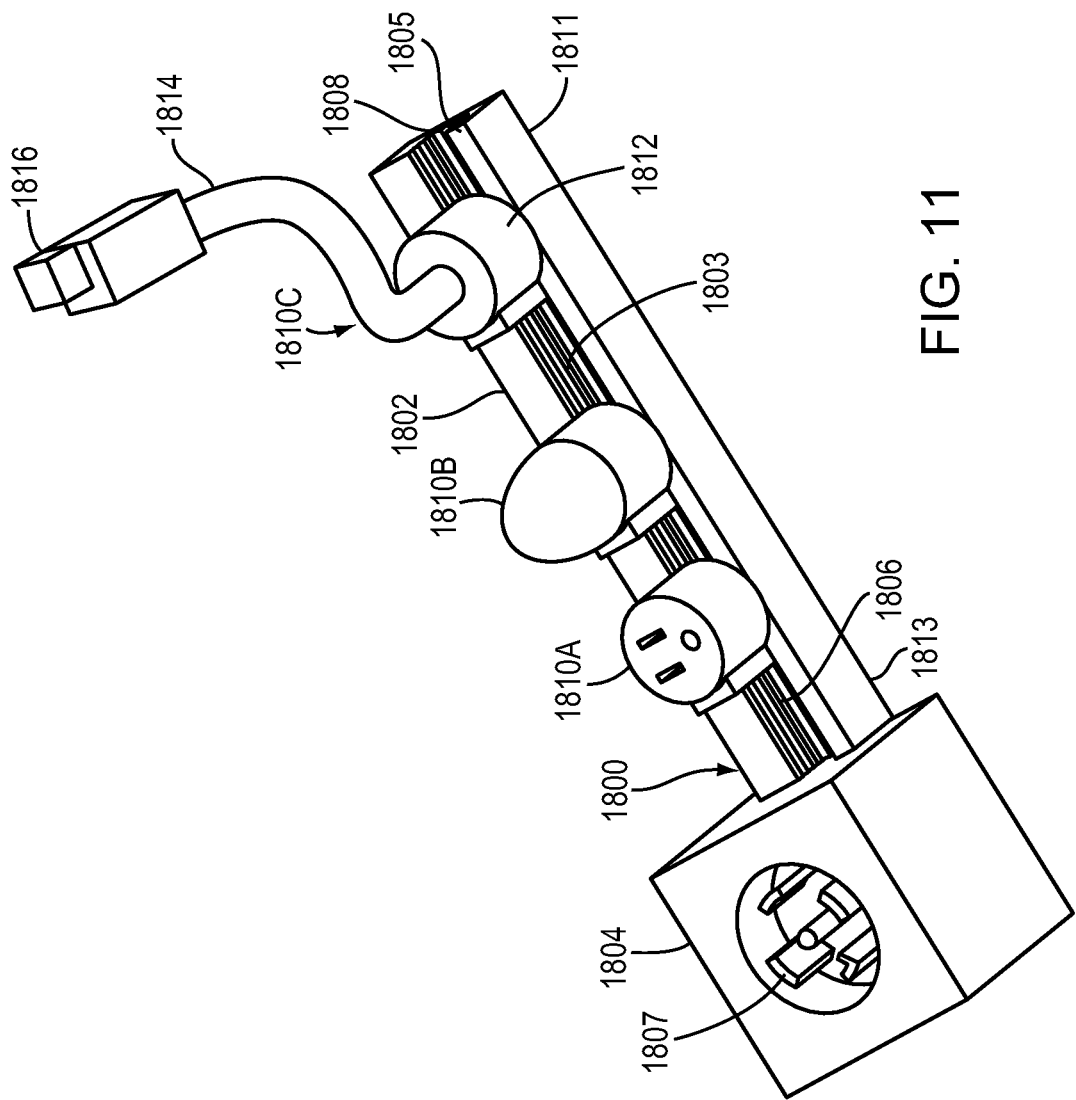
FIG. 11 illustrates a power distribution unit in accordance with one embodiment.

Referring now to FIG. 11, a power distribution unit 1800 is illustrated in accordance with one embodiment. In the illustrated embodiment, the power distribution unit 1800 includes a housing 1802, a plurality of electrical conductors 1803, and a power connection enclosure 1804. In some embodiments, the housing includes an outer wall 1805 that provides a cavity 1808 therewithin. Further, in the illustrated embodiment, the outer wall 1805 defines an opening 1806 that in the illustrated embodiment extends linearly from a first end 1811 of the housing to a second end 1813 of the housing. Further, although the first end 1811 of the housing is illustrated as being open, in other embodiments, the first end 1811 is closed.

According to the illustrated embodiment, the power connection enclosure 1804 includes a connector 1807, for example, a male plug that is configured to connect to a connector included in the power cord that supplies electrical power to the power distribution unit 1800. In various embodiments, the power connection enclosure 1804 may include connector 1807 including any of a male plug, a female plug or any other form of electrical connector known in the art. In another embodiment, the power connection enclosure 1804 may provide a connection point for power cord where individual conductors are connected to the power distribution unit at a terminal strip or other similar style mechanical connection where, for example, a plug-style connector is not employed. In yet another embodiment, the power distribution unit 1800 is attached to a first end of a power cord at the power connection enclosure 1804 where the second end of the power cord is connected to a plug in module, for example, as illustrated in FIG. 15. In a further embodiment, the cord is preterminated at the plug-in module.

The invention is not restricted to any specific quantity of electrical conductors 1803. Accordingly, in one embodiment, the electrical conductors 1803 include a plurality of phase conductors supplied from a multi-phase power source. In some other embodiments, the electrical conductors 1803 include a single phase conductor. In addition, the electrical conductors 1803 can include either or both of a neutral conductor and a ground conductor. Similarly, the power connection enclosure 1804 can be configured to receive any of a ground conductor, a neutral conductor and any number of phase conductors.

In the embodiment illustrated in FIG. 11, each of a plurality of tap modules 1810 can be removably attached to the power distribution unit by connecting them at any user selected location between the first end of the housing 1811 and the second end 1813. The plurality of tap modules 1810 can provide one or more electrical elements. For example, in the illustrated embodiment, a first tap module 1810A illustrates a receptacle outlet configured for direct connection to local utilization equipment, a second tap module 1810B includes an integral lamp, and a third tap module 1810C includes an electrical cord 1814 which may also include a receptacle outlet 1816 located at the end of the electrical cord 1814 opposite a body of the tap module 1812.

Where the tap module 1810 includes a receptacle outlet, examples of single phase outlets include NEMA types 5-15, L5-20 and L6-20, and IEC 320 type C13 and C19. Examples of three phase receptacle outlets include NEMA types L21-20, L14 and L15, and IEC 309. According to some embodiments, any of the preceding may be included at a distal end of a power cord 1814 included in the tap module 1810.

In accordance with some embodiments, the tap modules 1810 are connected to the electrical conductors 1803 by inserting the tap module 1810 into the cavity 1808 via the opening 1806 and rotating the tap module 1810 to engage one or more of the plurality of electrical conductors 1803. In accordance with one embodiment, the tap module is located in a first rotational position when it is inserted within the cavity 1808 and then rotated to a second rotational position (for example, a rotational position that is 90 degrees different) to complete the electrical connection between the tap module 1810 and the power distribution unit 1800.

Figure 12:
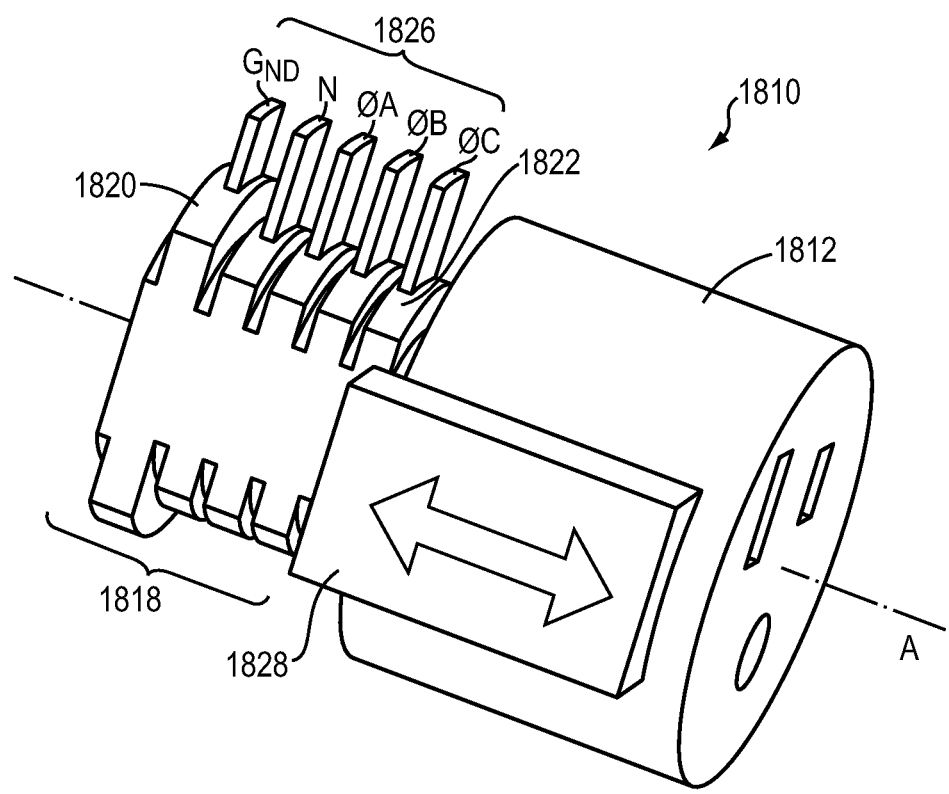
FIG. 12 illustrates a tap module in accordance with one embodiment.

Referring now to FIG. 12, an embodiment of the tap module 1810 is illustrated. In the illustrated embodiment, the tap module includes the body 1812, a shaft 1818, a plurality of contacts 1826 and a locking element 1828. According to this embodiment, the shaft 1818 is sized and shaped to allow insertion of the shaft into the cavity 1808 via the opening 1806 while a diameter of the body 1812 is sufficiently large to prevent the body 1812 from being inserted through the opening 1806. The shaft 1818 can include a first region 1820 having a first diameter and at least one second region 1822 having a second diameter. In accordance with the illustrated embodiment, a single first region 1820 is included on the shaft 1818 and a plurality of second regions each having the second diameter 1822 are included on the shaft 1818. Further, according to one embodiment, the first region is a region where a ground-conductor contact included in the plurality of contacts 1826 is located while the second regions 1822 each include a region for a phase-conductor contact, respectively, included in the plurality of conductors 1826. In addition, a second region can be included to house a neutral-conductor contact included in the plurality of contacts 1826. Further, as illustrated, each of the first and second regions 1820, 1822 are separated from adjacent regions on the shaft 1818 by slots 1824.

According to one embodiment, each of the body 1812 and the shaft 1818 are manufactured from insulating material selected from any one of or any combination of thermoplastic or thermosetting materials, for example, polycarbonates (PC), polyesters (PBT), polyphenal sulfide (PPS), etc. According to another embodiment, each of the body 1812 and the shaft 1818 are manufactured from a bulk molding compound (BMC).

Each of the plurality of contacts 1826 includes a region exposed outside the shaft 1818 of which at least a part is uninsulated. FIG. 12 illustrates each of the plurality of contacts 1826 in an embodiment where the exposed regions are entirely uninsulated, as one example. In addition to the exposed region, each of the contacts 1826 includes a portion that is located within the shaft 1818. It should be recognized that the necessary electrical connection between the plurality of contacts 1826 and the electrical element (i.e., receptacle outlet, lamp, cord, etc.) is completed within the shaft 1818 and/or body 1812.

Although the embodiment of FIG. 12 illustrates each of a plurality of phase-conductor contacts included in the plurality of contacts 1826, the tap module 1810 can be configured to include fewer than three or more than three phase conductors in some embodiments, for example, the tap module 1810 can include only a single phase conductor.

In accordance with one embodiment, the shaft 1818 is manufactured with the first region 1820 and the second regions 1822 including an opening in each region by which a user can selectively add any of the contacts 1826 required for their application by inserting the electrical conductor (also referred to as a conducting stab) within the opening. Thus, according to some embodiments, a user in the field can select the configuration of the tap module 1810 to improve and/or maintain a balanced loading of a multi-phase power source that supplies power to the power distribution unit 1800. For example, a user may connect a plurality of tap modules to a multiphase power distribution unit 1800 where each tap module 1810 includes a single phase receptacle outlet. According to one embodiment, the user can for a first tap module, insert a first contact in the opening configured for phase A; for a second tap module, insert a contact in the opening configured for phase B; and in the third tap module, insert a contact in the opening configured for phase C. Assuming that the three receptacle outlets are connected to utilization equipment with similar power requirements, the power distribution module will draw a substantially balanced load. In one embodiment, the openings configured to receive a conducting stab extend radially inward within the shaft 1818.

According to some embodiments, the locking member 1828 is a device that is sized and shaped to engage a portion of the power distribution unit 1800 to allow the tap module 1810 to be securely retained in place (absent a user's action). In accordance with the illustrated embodiment, the sliding device 1828 travels linearly (for example, in a direction of travel illustrated by the arrow) adjacent the body 1812 to allow full insertion of the tap module 1810 within the housing 1802 while also locking the tap module in place when an electrical connection between the tap module and the plurality of electrical conductors 1803 is completed. According to one embodiment, the locking member 1828 is spring biased in the direction of the shaft 1818 to allow the locking member to automatically secure the tap module in place when the electrical connection is complete. For example, the locking member 1828 may slide into the opening 1806 in the housing. To disconnect and remove the tap module 1801 from the housing 1802, the user manually withdraws the locking member from engagement with the opening 1806 to allow disconnection and removal of the tap module 1810 from the housing 1802.

Other structure and other arrangements may be employed for the locking member 1828 in various embodiments. For example, the locking member 1828 can be a device that requires the user to manually operate the locking member once the electrical connection is completed to secure the tap module 1810 in the connected position. Further, the locking member 1828 can engage the housing 1802 in a different manner, for example, the locking member can include a rotary latch.

Figure 13:
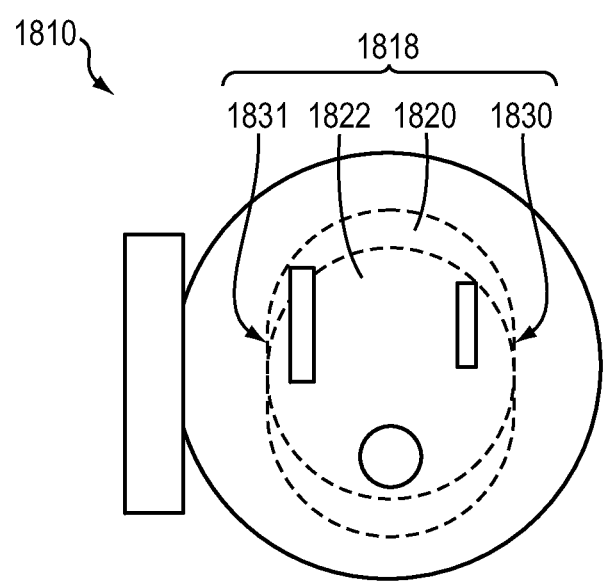
FIG. 13 illustrates a plan view of a tap module in accordance with the embodiment of FIG. 12.

Referring now to FIG. 13, the tap module 1810 of FIG. 12 is illustrated in accordance with one embodiment. The tap module 1810 includes the first region and the second region (each shown in phantom) having different diameters as mentioned above, and in addition, includes a first planar side 1830 and a second planar side 1831 located on opposite sides of the shaft 1818. In the illustrated embodiment, the width of the shaft 1818 between a first planar surface 1830 and the second planar surface 1831 is sized and configured to fit within the opening 1806. For example, the width of the shaft in the region between the planar surfaces 1830, 1831 is sized to be slightly smaller than a dimension of the opening 1806.

In accordance with some embodiments, the shaft 1818 is fully inserted within the cavity 1808 before it is rotated into a connected position in which the electrical connection between the electrical conductors 1826 and the plurality of electrical conductors 1803 is complete. Accordingly, in a first rotational position, the planar sides of the shaft 1818 align with the sides of the opening 1806 such that the shaft 1818 can be inserted through the opening into the cavity 1808.

Figure 14:
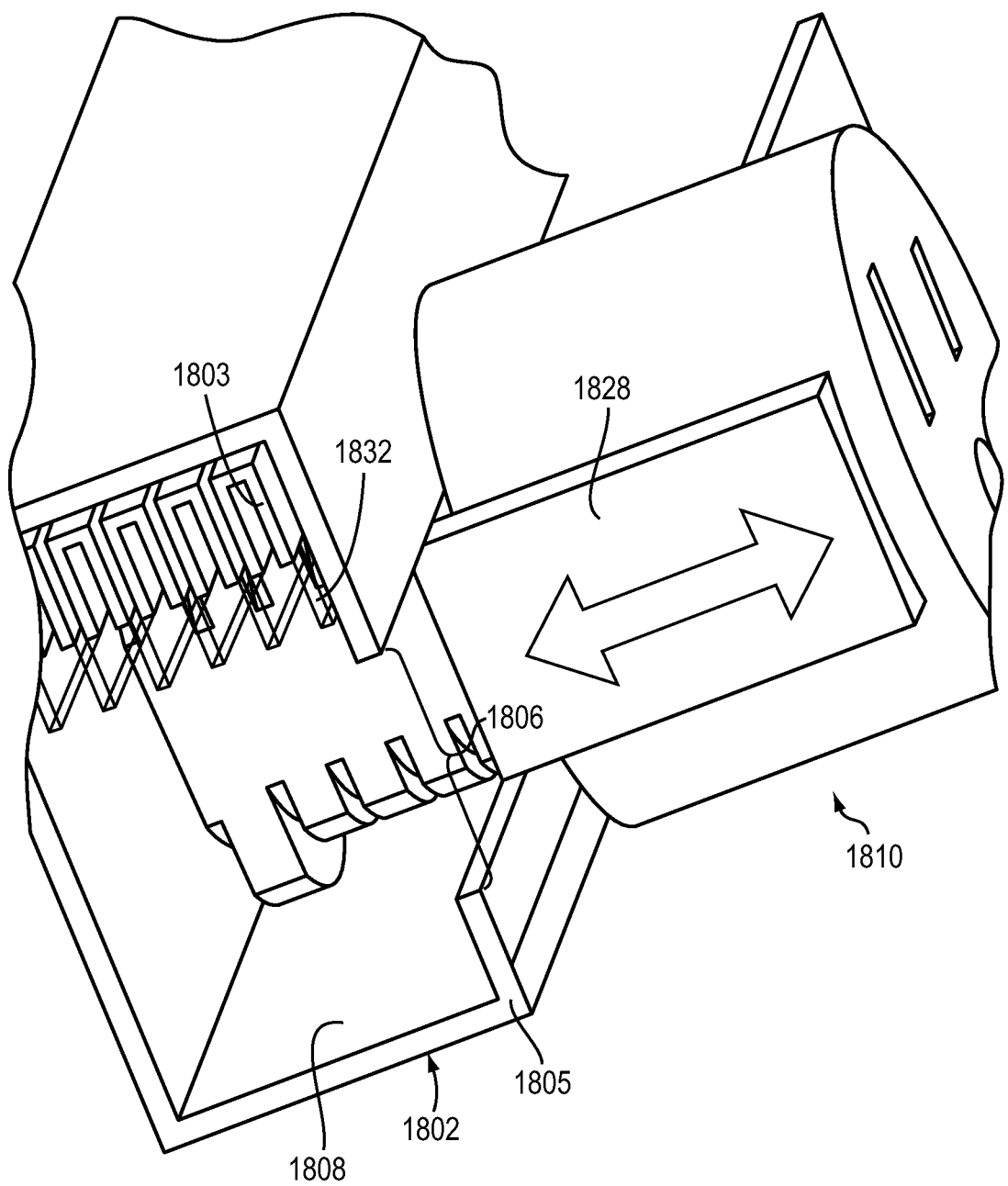
FIG. 14 illustrates a tap module connected to a power distribution unit in accordance with one embodiment.

Referring now to FIG. 14, a connection of a tap module 1810 to a power distribution unit 1800 is illustrated in accordance with one embodiment. The power distribution unit 1800 includes the cavity 1808 provided by the outer wall 1805 of the housing 1802. In addition, the linearly arranged opening 1806 is defined by the outer wall 1805. In the illustrated embodiment, the cavity 1808 includes the plurality of electrical conductors 1803 and a plurality of insulating members 1832. According to the illustrated embodiment, each of the plurality of electrical conductors 1803 is formed in a generally U-shape and extends linearly along a side of the cavity 1808 with the open part of the U oriented perpendicular relative to the opening 1806. Insulating members 1832 separate each of the electrical conductors 1803 from the adjacent electrical conductor and/or the outer wall 1805 of the housing 1802. According to this embodiment, the slotted regions 1824 of the shaft are aligned with a corresponding insulating member 1832 when the tap module is fully inserted in a connected position within the housing 1802. The first and second regions 1820 and 1822 are sized to fit between adjacent insulating members 1832 when the tap module 1810 is rotated into the connected position.

According to one embodiment, the insulating members 1832 are manufactured via an extrusion process from any one or any combination of polycarbonates (PC), polyesters (PBT), polyphenal sulfide (PPS), etc. According to another embodiment, the insulating members 1832 are manufactured as a post cut and formed from sheet thermoplastic or thermoset based material, for example, Nomex, Mylar, Polycarbonate, etc.

The tap module 1810 is inserted and placed in the fully connected position illustrated in FIG. 14 as follows: first, the tap module is positioned such that the planar sides of the shaft 1818 align with the opening 1806. The tap module is then pushed inward such that the shaft 1818 is fully inserted within the cavity 1808. As a result of this axial motion, the locking member 1828 slides in an axial direction away from the housing 1802 as it is pressed against the housing. According to one embodiment, the depth of the shaft 1818 is such that a surface of the body 1812 about the shaft contacts the outer wall 1805 of the housing when the insertion is complete. In some embodiments, the tap module 1810 is then rotated 90 degrees to rotate the conductors 1826 into engagement with the corresponding electrical conductor 1803. The locking member 1828 slides within the opening 1806 such that further rotation of the tap module is not possible when the tap module is properly oriented and the 90 degree rotation is complete. If a user wishes to withdraw the tap module from the housing 1802, the user first withdraws the locking element 1828 from the opening 1806 to release the locking member and allow the tap module to be rotated to the disconnected position and withdrawn, again with the planar sides 1830 and 1831 of the shaft 1818 aligned with the opening 1806.

Referring again to FIG. 13, the first region 1820 provides a lobe that assists the user in properly aligning the plurality of contacts 1826 with the plurality of electrical conductors located within the housing 1802 when the tap module is connected to the power distribution unit 1800. For example, in one embodiment, the lobe provided by the first region 1820 has a diameter that is large enough (relative to the diameter of the second regions 1822) that the tap module 1810 cannot be rotated in the fully connected position unless the shaft 1818 is inserted to the correct depth in the cavity to align the first region 1820 with a region within the housing 1802 having a diameter sufficiently large to receive the first region. In one example, the first region 1820 must be aligned with the region in the cavity where the ground conductor is located. It should be recognized that in various embodiments the first region 1820 can correspond to the location of a different conductor provided that the cavity within which the shaft 1818 is inserted is designed for that configuration. Thus, the first region 1820 can correspond to the location of the neutral conductor or one of the phase conductors. Further, in some embodiments, a tap module 1810 can be configured with two or more first regions 1820 such that proper alignment is confirmed when each of the two regions is located in a corresponding region, respectively, within the cavity.

Figure 15:
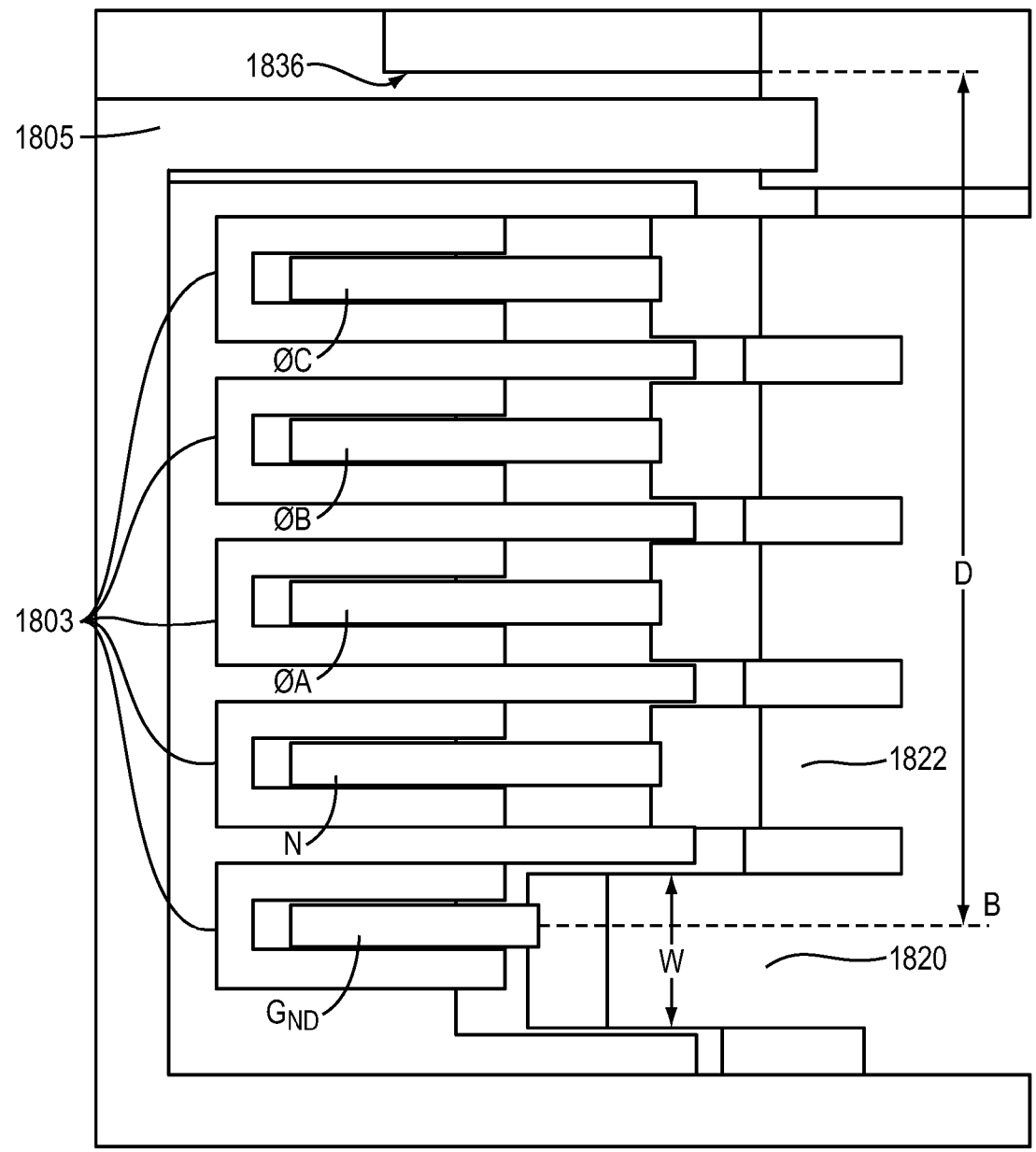
FIG. 15 illustrates a closer view of a connection of the tap module and the power distribution unit in accordance with the embodiment illustrated in FIG. 14.

FIG. 15 provides a close-up view of the completed electrical connection between the tap module 1810 and associated electrical conductors 1826 and the plurality of electrical conductors 1803 of the power distribution unit 1800. Here, a further embodiment illustrates how a dimensional difference between the first region 1820 and the second regions 1822 is used to achieve proper alignment. The plurality of electrical conductors 1803 are disposed within the cavity 1806 provided by the outer wall 1805 of the housing. A distance D between a face 1836 of the body 1812 and a longitudinal axis of a contact (for example, GND) located in the first region 1820 is established and the plurality of electrical conductors 1803 are oriented such that the contact in the first region aligns with the first region when the tap module is fully inserted in the housing 1802. In the illustrated embodiment, the first region includes both a larger diameter and a greater width W than other regions of the shaft 1818, to assist in properly aligning the tap module for completion of the electrical connections.

The above described embodiments can allow a user to easily add, remove and/or relocate a plurality of tap modules 1810 at any non-fixed location along the housing 1802 of the power distribution unit 1800. The preceding can be accomplished safely without need to de-energize the power distribution unit 1800.

As described above, according to various embodiments, the contacts 1826 are configured to be inserted and withdrawn from a corresponding first or second region within slots provided in each of these regions. According to one embodiment, a user can connect a single phase receptacle outlet included in a body 1812 of a tap module 1810 to a selected one of the available phases in a multi-phase power distribution unit while maintaining a ground and a neutral connection for the receptacle outlet as well. Subsequent tap modules 1810 that are connected to the housing 1802 can be connected to different phases to help maintain a balance load on the power system.

In accordance with various embodiments, the power distribution unit is configured as a rack mounted power distribution unit, similar to the general configuration provided by the rack mounted power distribution unit illustrated in FIGS. 8 and 9. Thus, for example, in one embodiment, the housing 1802 and/or power connection enclosure 1807 can include one or more flanges or other structure that allows power distribution unit to be installed in a standard electrical equipment rack. In some embodiments, the flange includes an opening for insertion of a screw or other fastener used to secure the housing 1802 to the electrical equipment rack.

According to these embodiments, the rack mounted power distribution unit including the housing 1802 allows for the connection of a plurality of tap modules at user selected locations within an electrical equipment rack. This provides advantages including a reduction in the length of electrical cords used to connect the power distribution unit to utilization equipment located in the electrical equipment rack.

Although the tap modules 1810 illustrated herein include electrical contacts 1826 which extend substantially perpendicular to the longitudinal axis A of the tap module 1810, other orientations can be employed in different embodiments. As one example, the electrical contacts 1826 can be provided in the form of contact pads exposed at the exterior surface of the shaft 1818. According to this embodiment, the plurality of electrical conductors 1803 are oriented within the housing 1802 to connect with the electrical contacts 1826. According to some embodiments, the electrical connection between the electrical contacts 1826 and the plurality of electrical conductors 1803 can be completed using only the linear insertion of the tap module 1810 within the housing 1802. For example, the contacts 1826 can include conducting stabs that extend perpendicular to the shaft 1818. The relative position of the electrical contacts 1826 can be offset relative to one another such that each conductor slides into engagement with one of the plurality of electrical conductors as a result of the axial motion provided to insert the tap module 1810 within the housing 1802.

According to some embodiments, the power distribution unit 1800 and the tap modules 1810 can include additional features to assist a user in analyzing and managing the power system in which they are employed. For example, the tap modules can include integral voltage and/or current sensing. Here, integral refers to the fact that the sensing devices are included in one or both of the shaft 1818 and the body 1812 of the tap module 1810. In addition to or in combination with the preceding, the power distribution unit 1800 can include voltage and/or current sensing. According to one embodiment, the voltage and/or current sensing devices are located in one or both of the power connection enclosure 1804 and the housing 1802.

In another embodiment, the tap modules 1810 can include integral relays, for example, located in the body 1812, that operate to energize and de-energize the electrical element included in the tap module. For example, where the electrical element includes an electrical cord 1814 and receptacle outlet 1816, the relay can be used to complete the electrical connection between the electrical cord 1814 and one or more of the electrical contacts 1826 at the instruction of a user. The preceding feature, for example, can be applied to advantage where the connected load is a server by operating the relay to disconnect and then reconnect the electrical connection to reboot the connected server. According to this embodiment the housing 1802 can include a control power bus for connection to the tap modules 1810 to provide control power for operation of the relays.

In further embodiments, the power distribution unit 1800 and/or tap modules 1810 can include network communication hardware. For example, the housing 1802 can include a communication bus. The communication bus can be configured to connect to the tap modules 1810 when the tap modules are inserted in the housing 1802 and placed in the fully connected position. According to this embodiment, the shaft 1818 can include one or more communication bus contacts. As some examples, the communication can include any of web enabled communication directly from the tap module 1810, Ethernet over power lines, and local CANBUS communication between the tap modules and a web-card located in the power distribution unit 1800. Further, a tap module 1810 can be provided with a communication link as the integral electrical element. According to this embodiment, a plurality of power distribution units 1800 (for example, those located in adjacent equipment racks) can be connected to a common communication bus by linking one power distribution unit 1800 to another by connecting communication links of the various power distribution units to one another via the tap modules 1810.

According to some embodiments, the tap modules 1810 or power distribution unit 1800 include overload protection. For example, the body 1812 of the tap module can include a miniature circuit breaker or other device to provide overcurrent protection for load connected to the tap module 1810. Where overcurrent protection is included in the power distribution unit 100 a miniature circuit breaker or other overcurrent protection device can be included in the power connection enclosure 1804 which can be sized and configured to accommodate the device.

The apparatus and systems described herein may be employed to provide a scalable and flexible power distribution system for any of a wide variety of facilities including data centers and other commercial and industrial facilities.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A rack mountable power distribution unit, comprising:
a housing having a first end and a second end, the housing including an outer wall defining a cavity within the housing, the housing further including fastening elements configured to allow the housing to be mounted within an electrical equipment rack, the outer wall of the housing including an opening extending along a length of the outer wall of the housing between the first end and the second end exposing the cavity;
a plurality of electrical conductors located within the cavity and oriented within the cavity and extending along a length between the first end and the second end, wherein each of the plurality of electrical conductors includes an elongated slot, the elongated slot being generally U-shaped; and
wherein each of the plurality of electrical conductors is separated from an adjacent electrical conductor of the plurality of electrical conductors by an insulating member.

2. The system of claim 1, wherein the elongated slot of each of a first group of the plurality of electrical conductors has a first width, and
wherein the elongated slot of each of a second group of electrical conductors of the plurality of electrical conductors has a second width different than the first width.

3. The system of claim 1, wherein the plurality of electrical conductors includes a ground conductor, a neutral conductor, and a single phase conductor.

4. A tap module for installing in a power distribution assembly, the tap module comprising:
a body;
a shaft coupled to the body including:
a first region having a first diameter, wherein the first region includes one or more locations for an electrical contact; and
a second region having a second diameter, wherein the second region includes one or more locations for an electrical contact;
at least one electrical contact included in the shaft and extending therefrom.

5. The tap module of claim 4, wherein the shaft includes a first planar side and a second planar side parallel to the first planar side, and
wherein the first planar side and the second planar side are located on opposite sides of the shaft.

6. The tap module of claim 4, wherein the at least one electrical contact includes one or more of a phase-conductor contact, a neutral-conductor contact and a ground-conductor contact.

7. The tap module of claim 4, wherein the at least one electrical contact is removably coupled to the shaft.

8. The tap module of claim 4, wherein the at least one electrical contact is a plurality of electrical contacts each having an exposed conductive surface.

9. The tap module of 4, wherein the at least one electrical contact is a plurality of electrical contacts having an insulation layer disposed over a portion of conductive surface.

10. The tap module of claim 4, further comprising network communication hardware within the body.

11. The tap module of claim 10, wherein the network communication hardware includes a CANBUS controller.

12. The tap module of claim 10, wherein the network communication hardware includes an Ethernet controller.

13. The tap module of claim 10, further comprising an electrical relay configured to be controlled by signals from the network communication hardware.

14. The tap module of claim 4, further comprising a locking element located adjacent to the body.

15. The tap module of claim 4, further comprising at least one circuit breaker coupled to the at least one electrical contact.

16. A method of installing a rack mountable power distribution unit in a facility, the method comprising acts of:
mounting the rack mountable power distribution unit in an electrical equipment enclosure, the rack mountable power distribution unit including a plurality of electrical contacts and being configured to receive a plurality of electrical tap modules at a plurality of non-fixed locations along a length of the rack mountable power distribution unit;
obtaining a plurality of tap modules, each of the plurality of tap modules including a plurality of electrical contacts; and
installing at least one tap module of the plurality of tap modules in the rack mountable power distribution unit by sliding at least one tap module of the plurality of tap modules into the rack mountable power distribution unit such that each of the plurality of electrical contacts of the at least one tap module of the plurality of tap modules is coupled to one or more electrical contacts in the rack mountable power distribution unit.

17. The method of claim 16, further comprising configuring the at least one tap module of the plurality of tap modules, before installing the at least one tap module of the plurality of tap modules, by inserting one or more electrical contacts into the at least one tap module of the plurality of tap modules.

18. The method of claim 17, wherein the at least one tap module of the plurality of tap modules includes a body, and wherein the act of inserting one or more electrical contacts into the at least one tap module of the plurality of tap modules includes removably coupling each of the one or more electrical contacts to a phase conductor included in the body.

19. The method of claim 17, wherein the at least one tap module of the plurality of tap modules includes a body, and wherein the act of inserting one or more electrical contacts into the at least one tap module of the plurality of tap modules includes removably coupling each of the one or more electrical contacts to a circuit breaker included in the body.

20. The method of claim 17, wherein the at least one tap module of the plurality of tap modules includes a body, and wherein the act of inserting or one more electrical contacts into the at least one tap module of the plurality of tap modules includes removably coupling each of the one or more electrical contacts to a communication bus included in the body.

* * * * *